US012735054B2

(12) United States Patent
Shimokawa

(10) Patent No.: US 12,735,054 B2
(45) Date of Patent: Sep. 15, 2026

(54) NOTIFICATION APPARATUS, NOTIFICATION METHOD, AND NON-TRANSITORY COMPUTER-READABLE STORAGE MEDIUM

(71) Applicant: CANON KABUSHIKI KAISHA, Tokyo (JP)

(72) Inventor: Yoshihiko Shimokawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 355 days.

(21) Appl. No.: 18/351,987

(22) Filed: Jul. 13, 2023

(65) Prior Publication Data

US 2024/0017732 A1 Jan. 18, 2024

(30) Foreign Application Priority Data

Jul. 15, 2022 (JP) ................................ 2022-114324

(51) Int. Cl.
*G01M 17/00* (2006.01)
*B60W 50/02* (2012.01)
*B60W 50/04* (2006.01)

(52) U.S. Cl.
CPC ...... *B60W 50/0205* (2013.01); *B60W 50/045* (2013.01); *B60W 2050/021* (2013.01); *B60W 2050/046* (2013.01)

(58) Field of Classification Search
CPC ........... B60W 50/0205; B60W 50/045; B60W 2050/021; B60W 2050/046; G08G 1/0141; G08G 1/0137; G08G 1/0112; G08G 1/0116; G06F 21/554; G07C 5/0841
See application file for complete search history.

(56) References Cited

U.S. PATENT DOCUMENTS

| | | | | |
|---|---|---|---|---|
| 2019/0043274 A1 | 2/2019 | Hayakawa | | |
| 2019/0057558 A1* | 2/2019 | Gupta | | B60W 50/04 |
| 2019/0061620 A1 | 2/2019 | Inaba | | |
| 2020/0137580 A1* | 4/2020 | Yang | | H04W 12/122 |
| 2020/0220888 A1 | 7/2020 | Terazawa | | |
| 2020/0242247 A1 | 7/2020 | Morita | | |
| 2021/0261135 A1 | 8/2021 | O'Flaherty | | |
| 2021/0344700 A1* | 11/2021 | Ueno | | G06F 21/552 |
| 2022/0041131 A1 | 2/2022 | Lee | | |
| 2022/0092975 A1* | 3/2022 | Park | | G08G 1/0116 |
| 2022/0297699 A1* | 9/2022 | Kim | | H04W 4/06 |

FOREIGN PATENT DOCUMENTS

| | | | |
|---|---|---|---|
| JP | 2008077320 | A | 4/2008 |
| JP | 6465278 | B2 | 2/2019 |
| JP | 2020119090 | A | 8/2020 |
| JP | 6761793 | B2 | 9/2020 |
| KR | 102329889 | B1 | 11/2021 |

* cited by examiner

*Primary Examiner* — Adam M Alharbi
(74) *Attorney, Agent, or Firm* — Canon U.S.A., Inc. IP Division

(57) ABSTRACT

A notification apparatus comprises a detection unit configured to detect an abnormality in a mounting apparatus with the notification apparatus mounted therein, and a notification unit configured to notify an external notification destination decided in accordance with the abnormality detected by the detection unit of the abnormality.

5 Claims, 34 Drawing Sheets

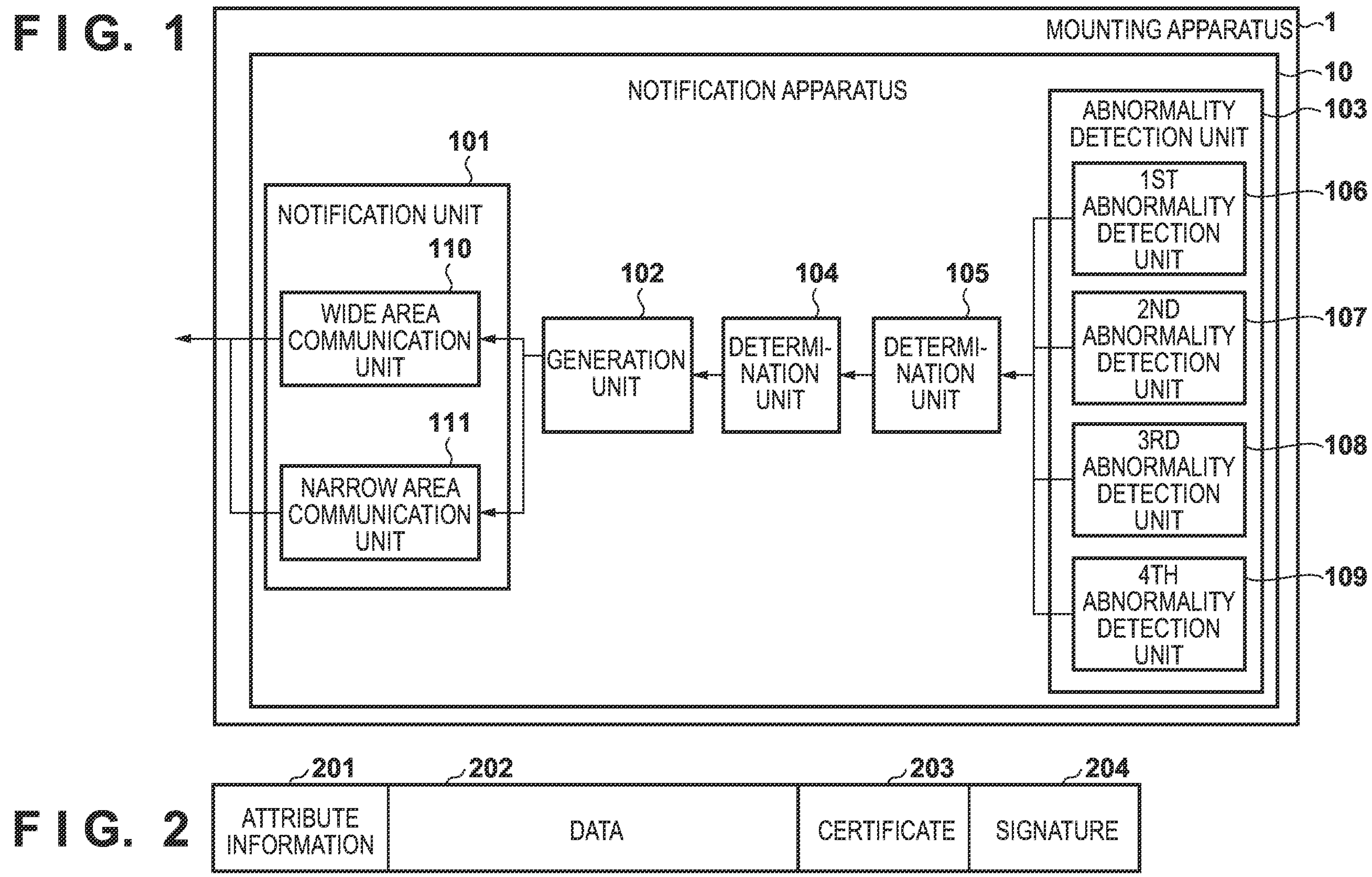
FIG. 1
MOUNTING APPARATUS
1
NOTIFICATION APPARATUS
10
ABNORMALITY DETECTION UNIT
103
1ST ABNORMALITY DETECTION UNIT
106
2ND ABNORMALITY DETECTION UNIT
107
3RD ABNORMALITY DETECTION UNIT
108
4TH ABNORMALITY DETECTION UNIT
109
105
DETERMI-NATION UNIT
104
DETERMI-NATION UNIT
102
GENERATION UNIT
101
NOTIFICATION UNIT
110
WIDE AREA COMMUNICATION UNIT
111
NARROW AREA COMMUNICATION UNIT
FIG. 2
201
ATTRIBUTE INFORMATION
202
DATA
203
CERTIFICATE
204
SIGNATURE

FIG. 3A-a 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION |
| SECURITY ABNORMALITY | VEHICLE/ VEHICLE ID1 | PRESENCE | IMPROPER ACCESS TO IN-VEHICLE NETWORK | LATITUDE xx/ LONGITUDE yy | 40km/h | $-5km/h^2$ | TRAVELING/ BRAKE ON/ ACCELERATOR OFF | LATITUDE xy/ LONGITUDE yz AFTER 5 SECONDS |
| SECURITY ABNORMALITY | VEHICLE/ VEHICLE ID5 | PRESENCE | RECEIVE UNAUTHENTIC MESSAGE | LATITUDE xy/ LONGITUDE yz | 0km/h | $0km/h^2$ | STOPPED/ BRAKE ON/ ACCELERATOR OFF | – |
| ... | ... | ... | ... | ... | ... | ... | ... | ... |

FIG. 3A-b 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | MODEL INFORMATION | SENSOR INFORMATION | SOFTWARE VERSION INFORMATION | ATTACKER IDENTIFICATION INFORMATION |
| SECURITY ABNORMALITY | VEHICLE/ VEHICLE ID1 | PRESENCE | IMPROPER ACCESS TO IN-VEHICLE NETWORK | LATITUDE xx/ LONGITUDE yy | VEHICLE MODEL A | CAMERA C/ LidarA | VERSION x,y | – |
| SECURITY ABNORMALITY | VEHICLE/ VEHICLE ID5 | PRESENCE | RECEIVE UNAUTHENTIC MESSAGE | LATITUDE zz/ LONGITUDE xx | VEHICLE MODEL B | CAMERA A/ LidarB | VERSION y,z | VEHICLE ID1 |
| SECURITY ABNORMALITY | ROAD SIDE MACHINE/ ROAD SIDE MACHINE ID2 | ABSENCE | INTERSECTION VIDEO IS DELETED | LATITUDE aa/ LONGITUDE bb | ROAD SIDE MACHINE C | CAMERA C/ LidarA | VERSION a,a | – |
| ... | ... | ... | ... | ... | ... | ... | ... | ... |

FIG. 3B-a 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION |
| SAFETY ABNORMALITY | VEHICLE/ VEHICLE ID1 | PRESENCE | DISCONNECT | LATITUDE xx/ LONGITUDE yy/ | 40km/h | $-5km/h^2$ | TRAVELING/ BRAKE ON/ ACCELERATOR OFF | LATITUDE xy/ LONGITUDE yz AFTER 5 SECONDS |
| SAFETY ABNORMALITY | VEHICLE/ VEHICLE ID10 | PRESENCE | UNEXPECTED POWER LOSS | LATITUDE xy/ LONGITUDE yz | 0km/h | $0km/h^2$ | STOPPED/ BRAKE ON/ ACCELERATOR OFF | – |
| SAFETY ABNORMALITY | VEHICLE/ VEHICLE ID5 | PRESENCE | BRAKE FUNCTION IS LOST | LATITUDE zz/ LONGITUDE xx | 60km/h | $2km/h^2$ | TRAVELING/ BRAKE OFF/ ACCELERATOR OFF | LATITUDE xx/ LONGITUDE yy AFTER 3 SECONDS |
| ... | ... | ... | ... | ... | ... | ... | ... | ... |

FIG. 3B-b 201 202

| ATTRIBUTE INFORMATION | | | DATA | | | | |
|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELERATION | CONTROL STATE |
| SAFETY ABNORMALITY | VEHICLE/ VEHICLE ID1 | PRESENCE | DISCONNECT | LATITUDE xx/ LONGITUDE yy/ | 40km/h | −5km/h$^2$ | TRAVELING/ BRAKE ON/ ACCELERATOR OFF |
| SAFETY ABNORMALITY | VEHICLE/ VEHICLE ID10 | PRESENCE | UNEXPECTED POWER LOSS | LATITUDE xy/ LONGITUDE yz | 0km/h | 0km/h$^2$ | STOPPED/ BRAKE ON/ ACCELERATOR OFF |
| SAFETY ABNORMALITY | VEHICLE/ VEHICLE ID5 | PRESENCE | BRAKE FUNCTION IS LOST | LATITUDE zz/ LONGITUDE xx | 60km/h | 2km/h$^2$ | TRAVELING/ BRAKE OFF/ ACCELERATOR OFF |
| SAFETY ABNORMALITY | ROAD SIDE MACHINE/ ROAD SIDE MACHINE ID2 | ABSENCE | COMMUNICATION NOISE | LATITUDE aa/ LONGITUDE bb | – | – | – |
| ... | ... | ... | ... | ... | ... | ... | ... |

FIG. 3C-a 201 202

| ATTRIBUTE INFORMATION | | | DATA | | | | | | | |
|---|---|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION | OFFENDING VEHICLE SPEED | OFFENDING VEHICLE IDENTIFICATION INFORMATION |
| TRAFFIC ABNORMALITY | ROAD SIDE MACHINE/ ROAD SIDE MACHINE ID1 | PRESENCE | TRAFFIC ACCIDENT | LATITUDE xx/ LONGITUDE yy | – | – | – | – | – | – |
| TRAFFIC ABNORMALITY | VEHICLE/ VEHICLE ID10 | PRESENCE | FALLEN OBJECT ON ROAD | LATITUDE xy/ LONGITUDE yz | 30km/h | 2km/h$^2$ | IN STOPPED/ BRAKE OFF/ ACCELE-RATOR ON | LATITUDE xy/ LONGITUDE yz AFTER 10 SECONDS | – | – |
| TRAFFIC ABNORMALITY | ROAD SIDE MACHINE/ ROAD SIDE MACHINE ID7 | PRESENCE | SPEEDER | LATITUDE zz/ LONGITUDE xx | – | – | – | – | 100km/h | VEHICLE ID5 |
| ... | ... | ... | ... | ... | ... | ... | ... | ... | ... | ... |

FIG. 3C-b 201 202

| ATTRIBUTE INFORMATION | | | DATA | | | |
|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | OFFENDING VEHICLE SPEED | OFFENDING VEHICLE IDENTIFICATION INFORMATION |
| TRAFFIC ABNORMALITY | ROAD SIDE MACHINE/ ROAD SIDE MACHINE ID1 | PRESENCE | TRAFFIC ACCIDENT | LATITUDE xx/ LONGITUDE yy | – | – |
| TRAFFIC ABNORMALITY | VEHICLE/ VEHICLE ID10 | PRESENCE | FALLEN OBJECT ON ROAD | LATITUDE xy/ LONGITUDE yz | – | – |
| TRAFFIC ABNORMALITY | ROAD SIDE MACHINE/ ROAD SIDE MACHINE ID7 | PRESENCE | SPEEDING VEHICLE | LATITUDE zz/ LONGITUDE xx | 100km/h | VEHICLE ID5 |
| ... | ... | ... | ... | ... | ... | ... |

FIG. 3D-a 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION |
| OPERATOR ABNORMALITY | VEHICLE/ VEHICLE ID1 | PRESENCE | DROWSY DRIVING | LATITUDE xx/ LONGITUDE yy | 40km/h | 5km/h$^2$ | TRAVELING/ BRAKE OFF/ ACCELERATOR ON | LATITUDE xy/ LONGITUDE yz AFTER 5 SECONDS |
| OPERATOR ABNORMALITY | VEHICLE/ VEHICLE ID10 | PRESENCE | CARDIO-PULMONARY ARREST | LATITUDE xy/ LONGITUDE yz | 30km/h | 2km/h$^2$ | IN STOPPED/ BRAKE OFF/ ACCELERATOR ON | LATITUDE xy/ LONGITUDE yz AFTER 10 SECONDS |
| OPERATOR ABNORMALITY | VEHICLE/ VEHICLE ID5 | PRESENCE | DRUNK DRIVING | LATITUDE zz/ LONGITUDE xx | 60km/h | −5km/h$^2$ | TRAVELING/ BRAKE ON/ ACCELERATOR OFF | LATITUDE xx/ LONGITUDE yy AFTER 3 SECONDS |
| ... | ... | ... | ... | ... | ... | ... | ... | ... |

F I G. 3D-b 201 202

| ATTRIBUTE INFORMATION | | | DATA | |
|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION |
| OPERATOR ABNORMALITY | VEHICLE/ VEHICLE ID1 | PRESENCE | DROWSY DRIVING | LATITUDE xx/ LONGITUDE yy |
| OPERATOR ABNORMALITY | VEHICLE/ VEHICLE ID10 | PRESENCE | CARDIOPULMONARY ARREST | LATITUDE xy/ LONGITUDE yz |
| OPERATOR ABNORMALITY | VEHICLE/ VEHICLE ID5 | PRESENCE | DRUNK DRIVING | LATITUDE zz/ LONGITUDE xx |
| ... | ... | ... | ... | ... |

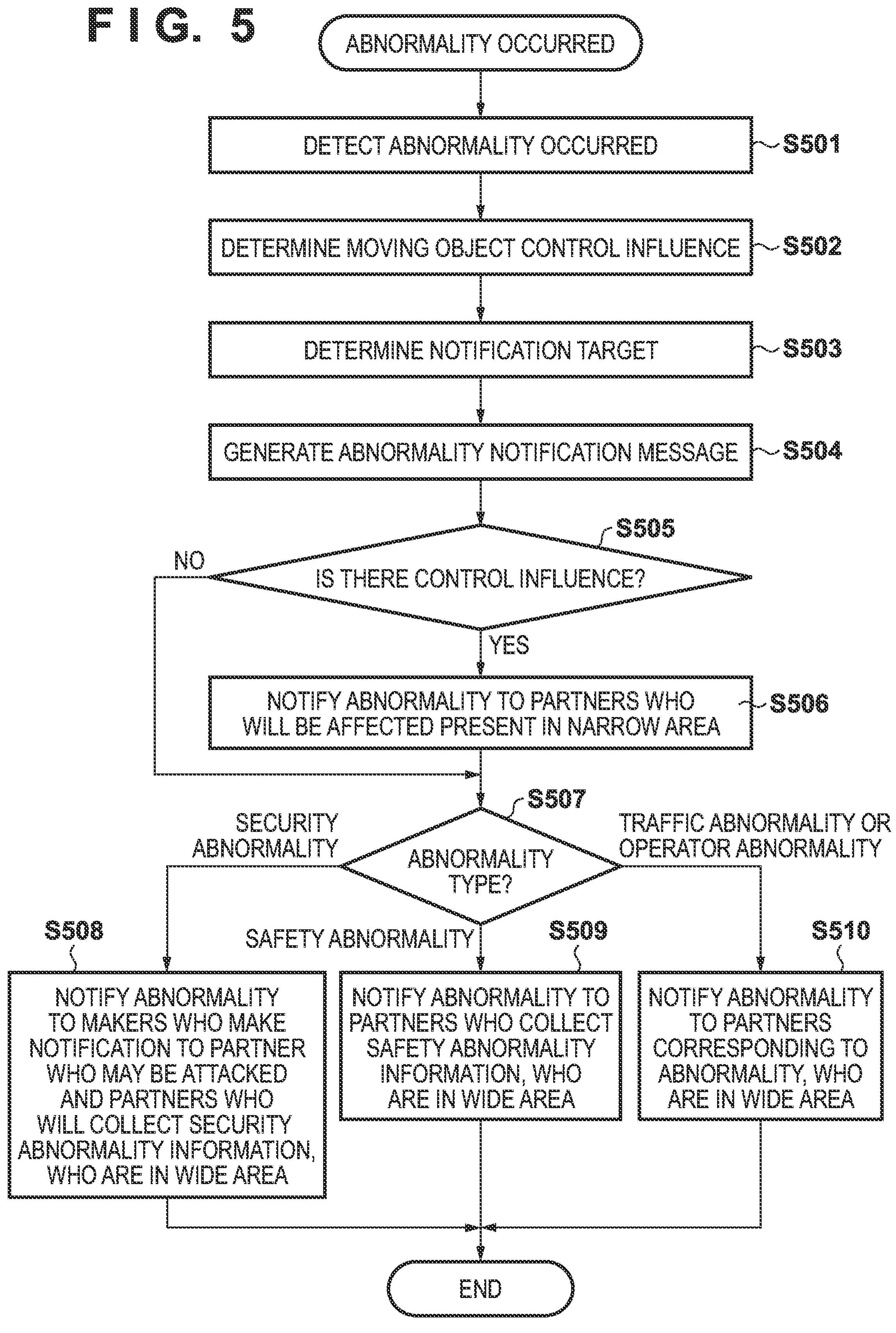
FIG. 5
ABNORMALITY OCCURRED
DETECT ABNORMALITY OCCURRED
S501
DETERMINE MOVING OBJECT CONTROL INFLUENCE
S502
DETERMINE NOTIFICATION TARGET
S503
GENERATE ABNORMALITY NOTIFICATION MESSAGE
S504
S505
IS THERE CONTROL INFLUENCE?
NO
YES
NOTIFY ABNORMALITY TO PARTNERS WHO WILL BE AFFECTED PRESENT IN NARROW AREA
S506
S507
ABNORMALITY TYPE?
SECURITY ABNORMALITY
TRAFFIC ABNORMALITY OR OPERATOR ABNORMALITY
SAFETY ABNORMALITY
S508
S509
S510
NOTIFY ABNORMALITY TO MAKERS WHO MAKE NOTIFICATION TO PARTNER WHO MAY BE ATTACKED AND PARTNERS WHO WILL COLLECT SECURITY ABNORMALITY INFORMATION, WHO ARE IN WIDE AREA
NOTIFY ABNORMALITY TO PARTNERS WHO COLLECT SAFETY ABNORMALITY INFORMATION, WHO ARE IN WIDE AREA
NOTIFY ABNORMALITY TO PARTNERS CORRESPONDING TO ABNORMALITY, WHO ARE IN WIDE AREA
END

FIG. 6

| ATTRIBUTE INFORMATION (201) | NOTIFICATION TARGET (205) | DATA (202) | CERTIFICATE (203) | SIGNATURE (204) |
|---|---|---|---|---|

FIG. 7A-a1

| ATTRIBUTE INFORMATION (201) | | | NOTIFICATION TARGET (205) | | DATA (202) | |
|---|---|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE | HORIZONTAL DISTANCE FROM CENTRAL | ABNORMALITY CONTENT | ABNORMALITY OCCURRENCE POSITION |
| SECURITY ABNORMALITY | VEHICLE/ VEHICLE ID1 | PRESENCE | LATITUDE xx/ LONGITUDE yy/ | 300m | IMPROPER ACCESS TO NETWORK | LATITUDE xx/ LONGITUDE yy |
| SECURITY ABNORMALITY | VEHICLE/ VEHICLE ID5 | ABSENCE | LATITUDE xx/ LONGITUDE yy LATITUDE xy/ LONGITUDE yx LATITUDE zz/ LONGITUDE yy LATITUDE zy/ LONGITUDE zx | – | RECEIVE UNAUTHENTIC MESSAGE | LATITUDE xy/ LONGITUDE yz |
| ... | ... | ... | ... | ... | ... | ... |

| DATA | | | | | | | |
|---|---|---|---|---|---|---|---|
| SPEED | ACCELERATION | CONTROL STATE | MOVEMENT PREDICTION INFORMATION | MODEL INFORMATION | SENSOR INFORMATION | SOFTWARE VERSION | ATTACKER IDENTIFICATION INFORMATION |
| 40km/h | $-5km/h^2$ | TRAVELING/ BRAKE ON/ ACCELERATOR OFF | LATITUDE xy/ LONGITUDE yz AFTER 5 SECONDS | VEHICLE MODEL A | CAMERA C/ LidarA | VERSION x.y | – |
| 0km/h | $0km/h^2$ | STOPPED/ BRAKE ON/ ACCELERATOR OFF | LATITUDE xy/ LONGITUDE yz AFTER 5 SECONDS | VEHICLE MODEL B | CAMERA A/ LidarB | VERSION y.z | VEHICLE ID1 |
| ... | ... | ... | ... | ... | ... | ... | ... |

| ATTRIBUTE INFORMATION | | | NOTIFICATION TARGET | |
|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE | HORIZONTAL DISTANCE FROM CENTRAL |
| SAFETY ABNORMALITY | VEHICLE/ VEHICLE ID1 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| SAFETY ABNORMALITY | VEHICLE/ VEHICLE ID10 | PRESENCE | LATITUDE xx/LONGITUDE yy<br>LATITUDE xy/LONGITUDE yz | 200m |
| SAFETY ABNORMALITY | VEHICLE/ VEHICLE ID5 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| ... | ... | ... | ... | ... |

| DATA | | | | | |
|---|---|---|---|---|---|
| ABNORMALITY CONTENT | ABNORMALITY OCCURRENCE POSITION | SPEED | ACCELERATION | CONTROL STATE | MOVEMENT PREDICTION INFORMATION |
| DISCONNECT | LATITUDE xx/ LONGITUDE yy | 40km/h | $-5km/h^2$ | TRAVELING/ BRAKE ON/ ACCELERATOR OFF | LATITUDE xy/ LONGITUDE yz AFTER 5 SECONDS |
| UNEXPECTED POWER LOSS | LATITUDE xy/ LONGITUDE yz | 0km/h | $0km/h^2$ | STOPPED/ BRAKE ON/ ACCELERATOR OFF | – |
| BRAKE FUNCTION IS LOST | LATITUDE zz/ LONGITUDE xx | 60km/h | $2km/h^2$ | TRAVELING/ BRAKE OFF/ ACCELERATOR OFF | LATITUDE xx/ LONGITUDE yy AFTER 3 SECONDS |
| ... | ... | ... | ... | ... | ... |

F I G. 7B-a1

201 205

| ATTRIBUTE INFORMATION | | | NOTIFICATION TARGET | |
|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE | HORIZONTAL DISTANCE FROM CENTRAL |
| TRAFFIC ABNORMALITY | ROAD SIDE MACHINE/ ROAD SIDE MACHINE ID1 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| TRAFFIC ABNORMALITY | VEHICLE/ VEHICLE ID10 | ABSENCE | LATITUDE xx/LONGITUDE yy | 1000m |
| TRAFFIC ABNORMALITY | ROAD SIDE MACHINE/ ROAD SIDE MACHINE ID7 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| ... | ... | ... | ... | ... |

| DATA | | | | | | | |
|---|---|---|---|---|---|---|---|
| ABNORMALITY CONTENT | ABNORMALITY OCCURRENCE POSITION | SPEED | ACCELERATION | CONTROL STATE | MOVEMENT PREDICTION INFORMATION | OFFENDING VEHICLE SPEED | OFFENDING VEHICLE IDENTIFICATION INFORMATION |
| TRAFFIC ACCIDENT | LATITUDE xx/ LONGITUDE yy | – | – | – | – | – | – |
| FALLEN OBJECT ON ROAD | LATITUDE xy/ LONGITUDE yz | 30km/h | 2km/$h^2$ | TRAVELING/ BRAKE OFF/ ACCELERATOR ON | LATITUDE xy/ LONGITUDE yz AFTER 10 SECONDS | – | – |
| SPEEDING VEHICLE | LATITUDE zz/ LONGITUDE xx | – | – | – | – | 100km/h | VEHICLE ID5 |
| ... | ... | ... | ... | ... | ... | ... | ... |

| ATTRIBUTE INFORMATION | | | NOTIFICATION TARGET | |
|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE | HORIZONTAL DISTANCE FROM CENTRAL |
| OPERATOR ABNORMALITY | VEHICLE/ VEHICLE ID1 | PRESENCE | LATITUDE xx/LONGITUDE yy | 200m |
| OPERATOR ABNORMALITY | VEHICLE/ VEHICLE ID10 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| OPERATOR ABNORMALITY | VEHICLE/ VEHICLE ID5 | PRESENCE | LATITUDE xx/LONGITUDE yy<br>LATITUDE xy/LONGITUDE yx<br>LATITUDE zz/LONGITUDE yy<br>LATITUDE zy/LONGITUDE zx | – |
| ... | ... | ... | ... | ... |

| DATA | | | | | |
|---|---|---|---|---|---|
| ABNORMALITY CONTENT | ABNORMALITY OCCURRENCE POSITION | SPEED | ACCELERATION | CONTROL STATE | MOVEMENT PREDICTION INFORMATION |
| DROWSY DRIVING | LATITUDE xx/ LONGITUDE yy | 40km/h | 5km/$h^2$ | TRAVELING/ BRAKE OFF/ ACCELERATOR ON | LATITUDE xy/ LONGITUDE yz AFTER 5 SECONDS |
| CARDIOPULMONARY ARREST | LATITUDE xy/ LONGITUDE yz | 30km/h | 2km/$h^2$ | IN STOPPED/ BRAKE OFF/ ACCELERATOR ON | LATITUDE xy/ LONGITUDE yz AFTER 10 SECONDS |
| DRUNK DRIVING | LATITUDE zz/ LONGITUDE xx | 60km/h | −5km/$h^2$ | TRAVELING/ BRAKE ON/ ACCELERATOR OFF | LATITUDE xx/ LONGITUDE yy AFTER 3 SECONDS |
| ... | ... | ... | ... | ... | ... |

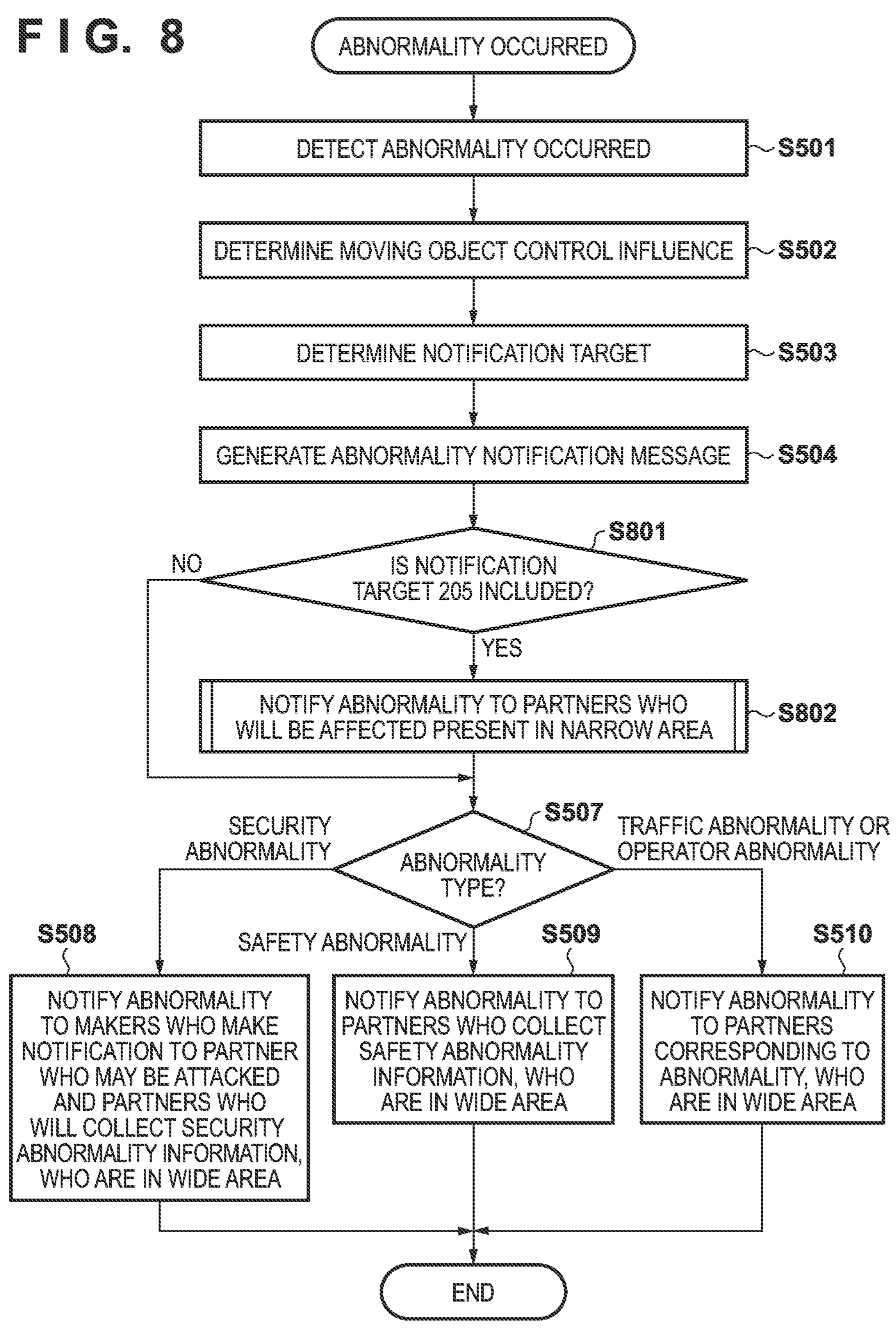
FIG. 8
ABNORMALITY OCCURRED
DETECT ABNORMALITY OCCURRED
S501
DETERMINE MOVING OBJECT CONTROL INFLUENCE
S502
DETERMINE NOTIFICATION TARGET
S503
GENERATE ABNORMALITY NOTIFICATION MESSAGE
S504
S801
IS NOTIFICATION TARGET 205 INCLUDED?
NO
YES
NOTIFY ABNORMALITY TO PARTNERS WHO WILL BE AFFECTED PRESENT IN NARROW AREA
S802
S507
ABNORMALITY TYPE?
SECURITY ABNORMALITY
SAFETY ABNORMALITY
TRAFFIC ABNORMALITY OR OPERATOR ABNORMALITY
S508
NOTIFY ABNORMALITY TO MAKERS WHO MAKE NOTIFICATION TO PARTNER WHO MAY BE ATTACKED AND PARTNERS WHO WILL COLLECT SECURITY ABNORMALITY INFORMATION, WHO ARE IN WIDE AREA
S509
NOTIFY ABNORMALITY TO PARTNERS WHO COLLECT SAFETY ABNORMALITY INFORMATION, WHO ARE IN WIDE AREA
S510
NOTIFY ABNORMALITY TO PARTNERS CORRESPONDING TO ABNORMALITY, WHO ARE IN WIDE AREA
END

FIG. 10A-a 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELERATION | CONTROL STATE | MOVEMENT PREDICTION INFORMATION |
| SECURITY ABNORMALITY | DRONE/ DRONE ID1 | PRESENCE | IMPROPER ACCESS TO IN-VEHICLE NETWORK | LATITUDE xx/ LONGITUDE yy/ ALTITUDE zz | 10km/h | $-1km/h^2$ | MOVING IN AIR | AFTER 5 SECOND LATITUDE xy/ LONGITUDE yz/ ALTITUDE yz |
| SECURITY ABNORMALITY | DRONE/ DRONE ID5 | PRESENCE | RECEIVE UNAUTHENTIC MESSAGE | LATITUDE zz/ LONGITUDE xx/ ALTITUDE yy | 20km/h | $2km/h^2$ | STOPPED ON GROUND | – |
| ... | ... | ... | ... | ... | ... | ... | ... | ... |

FIG. 10A-b 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | MODEL INFORMATION | SENSOR INFORMATION | SOFTWARE VERSION INFORMATION | ATTACKER IDENTIFICATION INFORMATION |
| SECURITY ABNORMALITY | DRONE/ DRONE ID1 | PRESENCE | DETECT MALWARE | LATITUDE xx/ LONGITUDE yy/ ALTITUDE zz | DRONE TYPE A | CAMERA C/ LidarA | VERSION x.y | - |
| SECURITY ABNORMALITY | DRONE/ DRONE ID5 | PRESENCE | RECEIVE UNAUTHENTIC MESSAGE | LATITUDE zz/ LONGITUDE xx/ ALTITUDE yy | DRONE TYPE B | CAMERA A/ LidarB | VERSION y.z | DRONE ID 10 |
| SAFETY ABNORMALITY | FIXED COMMUNICATION APPARATUS/ FIXED COMMUNICATION APPARATUS ID2 | ABSENCE | INFORMATION HELD BY FIXED COMMUNICATION APPARATUS IS ALTERED | LATITUDE aa/ LONGITUDE bb/ ALTITUDE cc | - | CAMERA C/ LidarA | VERSION a.a | - |
| ... | ... | ... | ... | ... | ... | ... | ... | ... |

FIG. 10B-a 201 202

| ATTRIBUTE INFORMATION | | | DATA | | | | | |
|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION |
| SAFETY ABNORMALITY | DRONE/ DRONE ID1 | PRESENCE | DISCONNECT | LATITUDE xx/ LONGITUDE yy/ ALTITUDE zz | 10km/h | $-1km/h^2$ | STOPPED IN AIR | AFTER 5 SECOND LATITUDE xy/ LONGITUDE yz/ ALTITUDE yz |
| SAFETY ABNORMALITY | DRONE/ DRONE ID5 | PRESENCE | LOSS HORIZONTAL MAINTAINING FUNCTION | LATITUDE zz/ LONGITUDE xx/ ALTITUDE yy | 20km/h | $2km/h^2$ | MOVING IN AIR | AFTER 5 SECOND LATITUDE xy/ LONGITUDE yz/ ALTITUDE yz |
| SAFETY ABNORMALITY | FIXED COMMUNICATION APPARATUS/ FIXED COMMUNICATION APPARATUS ID2 | PRESENCE | COMMUNICATION NOISE | LATITUDE aa/ LONGITUDE bb/ ALTITUDE cc | – | – | – | – |
| ... | ... | ... | ... | ... | ... | ... | ... | ... |

FIG. 10B-b 201 202

| ATTRIBUTE INFORMATION | | | DATA | | | | |
|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELERATION | CONTROL STATE |
| SAFETY ABNORMALITY | DRONE/ DRONE ID1 | PRESENCE | DISCONNECT | LATITUDE xx/ LONGITUDE yy/ ALTITUDE zz | 10km/h | $-1 km/h^2$ | STOPPED IN AIR |
| SAFETY ABNORMALITY | DRONE/ DRONE ID5 | PRESENCE | LOSS HORIZONTAL MAINTAINING FUNCTION | LATITUDE zz/ LONGITUDE xx/ ALTITUDE yy | 20km/h | $2 km/h^2$ | MOVING IN AIR |
| SAFETY ABNORMALITY | FIXED COMMUNICATION APPARATUS/ FIXED COMMUNICATION APPARATUS ID2 | PRESENCE | COMMUNICATION NOISE | LATITUDE aa/ LONGITUDE bb/ ALTITUDE cc | – | – | – |
| ... | ... | ... | ... | ... | ... | ... | ... |

FIG. 10C-a 201 202

| ATTRIBUTE INFORMATION | | | DATA | | | | | | | |
|---|---|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | SPEED | ACCELE-RATION | CONTROL STATE | MOVEMENT PREDICTION INFORMATION | VIOLATION MOVING OBJECT SPEED | VIOLATION MOVING OBJECT IDENTIFICATION INFORMATION |
| TRAFFIC ABNORMALITY | DRONE/ DRONE ID9 | PRESENCE | FLOATING MATTER IN AIR | LATITUDE xy/ LONGITUDE yz/ ALTITUDE zx | 10km/h | −1km/h$^2$ | STOPPED IN AIR | AFTER 5 SECOND LATITUDE xy/ LONGITUDE yz/ ALTITUDE yz | – | – |
| TRAFFIC ABNORMALITY | DRONE/ DRONE ID7 | PRESENCE | THERE IS DRONE IN NO ENTRY AREA | LATITUDE zz/ LONGITUDE xx/ ALTITUDE yy | 20km/h | 2km/h$^2$ | MOVING IN AIR | AFTER 5 SECOND LATITUDE xy LONGITUDE yz/ ALTITUDE yz | 20km/h | DRONE ID9 |
| ... | ... | ... | ... | ... | ... | ... | ... | ... | ... | ... |

FIG. 10C-b 201 202

| ATTRIBUTE INFORMATION | | | DATA | | | |
|---|---|---|---|---|---|---|
| ABNORMALITY TYPE | TRANSMISSION SOURCE IDENTIFICATION INFORMATION | MOVING OBJECT CONTROL INFLUENCE INFORMATION | ABNORMALITY CONTENT | ABNORMALITY OCCURRENCE POSITION | VIOLATION MOVING OBJECT SPEED | VIOLATION MOVING OBJECT IDENTIFICATION INFORMATION |
| TRAFFIC ABNORMALITY | DRONE/ DRONE ID9 | PRESENCE | FALLEN OBJECT ON ROAD | LATITUDE xy/ LONGITUDE yz/ ALTITUDE zx | – | – |
| TRAFFIC ABNORMALITY | DRONE/ DRONE ID7 | PRESENCE | THERE IS DRONE IN NO ENTRY AREA | LATITUDE zz/ LONGITUDE xx/ ALTITUDE yy | ~10km/h | DRONE ID5 |
| ... | ... | ... | ... | ... | ... | ... |

| ATTRIBUTE INFORMATION | | | NOTIFICATION TARGET | | DATA | |
|---|---|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE, ALTITUDE | HORIZONTAL DISTANCE FROM CENTRAL | ABNORMALITY CONTENT | ABNORMALITY OCCURRENCE POSITION |
| SECURITY ABNORMALITY | DRONE/ DRONE ID1 | PRESENCE | LATITUDE xx/ LONGITUDE yy/ ALTITUDE zz , LATITUDE xx/ LONGITUDE yy/ ALTITUDE aa | 300m | IMPROPER ACCESS TO VEHICLE NETWORK | LATITUDE xx/ LONGITUDE yy/ ALTITUDE zz |
| SECURITY ABNORMALITY | DRONE/ DRONE ID5 | PRESENCE | LATITUDE xx/ LONGITUDE yy/ ALTITUDE aa , LATITUDE xx/ LONGITUDE yy/ ALTITUDE bb | 200m | RECEIVE UNAUTHENTIC MESSAGE | LATITUDE xy/ LONGITUDE yz/ ALTITUDE zx |
| ... | ... | ... | ... | ... | ... | ... |

| DATA | | | | | | | |
|---|---|---|---|---|---|---|---|
| SPEED | ACCELERATION | CONTROL STATE | MOVEMENT PREDICTION INFORMATION | MODEL INFORMATION | SENSOR INFORMATION | SOFTWARE VERSION | ATTACKER IDENTIFICATION INFORMATION |
| 10km/h | $-1km/h^2$ | STOPPED IN AIR | AFTER 5 SECOND LATITUDE xy/ LONGITUDE yz/ ALTITUDE zx | DRONE A | CAMERA C/ LidarA | VERSION x.y | – |
| 20km/h | $2km/h^2$ | MOVING IN AIR | AFTER 5 SECOND LATITUDE xy/ LONGITUDE yz/ ALTITUDE zx | DRONE B | CAMERA A/ LidarB | VERSION y.z | DRONE ID9 |
| ... | ... | ... | ... | ... | ... | ... | ... |

FIG. 12A-b 201 205 202

| ATTRIBUTE INFORMATION | | | NOTIFICATION TARGET | | DATA | | | | | |
|---|---|---|---|---|---|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE, ALTITUDE | HORIZONTAL DISTANCE FROM CENTRAL | ABNORMALITY CONTENT | ABNORMALITY OCCURRENCE POSITION | SPEED | ACCELE-RATION | CONTROL STATE | MOVEMENT PREDICTION INFORMATION |
| SAFETY ABNORMALITY | DRONE/ DRONE ID1 | PRESENCE | LATITUDE xx/ LONGITUDE yy/ ALTITUDE zz , LATITUDE xx/ LONGITUDE yy/ ALTITUDE aa | 300m | DISCONNECT | LATITUDE xx/ LONGITUDE yy/ ALTITUDE zz | 10km/h | −1km/h$^2$ | STOPPED IN AIR | AFTER 5 SECOND LATITUDE xy/ LONGITUDE yz/ ALTITUDE zx |
| SAFETY ABNORMALITY | DRONE/ DRONE ID5 | PRESENCE | LATITUDE xx/ LONGITUDE yy/ ALTITUDE aa , LATITUDE xx/ LONGITUDE yy/ ALTITUDE bb | 200m | UNEXPECTED POWER LOSS | LATITUDE xy/ LONGITUDE yz/ ALTITUDE zx | 10km/h | −1km/h$^2$ | STOPPED ON GROUND | – |
| SAFETY ABNORMALITY | FIXED COMMUNICATION APPARATUS/ FIXED COMMUNICATION APPARATUS ID2 | PRESENCE | LATITUDE xx/ LONGITUDE yy/ ALTITUDE aa | 200m | HORIZONTAL FUNCTION IS LOST | LATITUDE aa/ LONGITUDE bb/ ALTITUDE cc | – | – | – | – |
| ... | ... | ... | ... | ... | ... | ... | ... | ... | ... | ... |

| ATTRIBUTE INFORMATION | | | NOTIFICATION TARGET | |
|---|---|---|---|---|
| ABNORMALITY TYPE | TRANSMISSION SOURCE IDENTIFICATION INFORMATION | MOVING OBJECT CONTROL INFLUENCE INFORMATION | LATITUDE, LONGITUDE, ALTITUDE | HORIZONTAL DISTANCE FROM CENTRAL |
| TRAFFIC ABNORMALITY | DRONE/ DRONE ID9 | PRESENCE | LATITUDE xx/ LONGITUDE yy/ ALTITUDE aa , LATITUDE xx/ LONGITUDE yy/ ALTITUDE bb | 200m |
| TRAFFIC ABNORMALITY | DRONE/ DRONE ID7 | PRESENCE | LATITUDE xx/ LONGITUDE yy/ ALTITUDE zz , LATITUDE xx/ LONGITUDE yy/ ALTITUDE aa | 300m |
| ... | ... | ... | ... | ... |

F I G. 12B-2

202

| DATA | | | | | | | |
|---|---|---|---|---|---|---|---|
| ABNORMALITY CONTENT | ABNORMALITY OCCURRENCE POSITION | SPEED | ACCELERATION | CONTROL STATE | MOVEMENT PREDICTION INFORMATION | VIOLATION MOVING OBJECT SPEED | VIOLATION MOVING OBJECT IDENTIFICATION INFORMATION |
| FLOATING MATTER IN AIR | LATITUDE xx/ LONGITUDE yy/ ALTITUDE zz | 10km/h | $-1 km/h^2$ | MOVING IN AIR | AFTER 5 SECOND LATITUDE xy/ LONGITUDE yz/ ALTITUDE zx | – | – |
| THERE IS DRONE IN NO ENTRY AREA | LATITUDE xy/ LONGITUDE yz/ ALTITUDE zx | 20km/h | $2 km/h^2$ | MOVING IN AIR | AFTER 3 SECOND LATITUDE xx LONGITUDE yy/ ALTITUDE zz | 20km/h | DRONE ID9 |
| ... | ... | ... | ... | ... | ... | ... | ... |

NOTIFICATION APPARATUS, NOTIFICATION METHOD, AND NON-TRANSITORY COMPUTER-READABLE STORAGE MEDIUM

BACKGROUND OF THE INVENTION

Field of the Invention

The present invention relates to a notification apparatus and method.

Description of the Related Art

A vehicle may be configured to transmit/receive information by "V2X" communication. Such communication may include Vehicle To Vehicle (V2V) communication, e.g., with another vehicle, or Vehicle To Infrastructure (V2I) communication, e.g., with a road side machine such as a traffic signal. Examples of information to be transmitted/received are a traveling position and a moving speed measured by sensors mounted in the vehicle. The vehicle can control traveling of the vehicle based on the information measured by the sensors of the vehicle and information received by V2X communication (e.g., the vehicle may be configured for self-navigation (i.e., a self-navigating vehicle). In particular, if an abnormality occurs in the vehicle, to prevent a traffic accident, it is important to transmit abnormality information and control the vehicle based on received abnormality information.

Also, currently, moves of utilizing a drone, e.g., a Small Unmanned Vehicle (SUV), are becoming active. For example, if a drone should be used for load delivery in the future, the drone is assumed to fly in the air about 150 m above the ground in an automatic driving mode. On the other hand, if an abnormality occurs in the drone, then a situation may arise where autonomous flight is impossible and/or the drone may collide against another drone. In these situations, the drone or load may fall on the ground, resulting in injury of a pedestrian or the like on the ground. For this reason, it is important to notify other drones or vehicles, pedestrians, and the like on the ground of the abnormality that has occurred in the drone.

Japanese Patent No. 6465278 discloses a technique of, in a case where an abnormality occurs in a vehicle, notifying other vehicles on the periphery of the occurrence of the abnormality and avoiding a traffic accident.

Also, Japanese Patent Laid-Open No. 2008-77320 discloses a technique of, in a case where an abnormality such as a hazard occurs in a vehicle, making a communication output larger than in a case without the occurrence of the abnormality, thereby reliably notifying other vehicles of information.

Furthermore, abnormalities that occur in a moving object or a fixed communication apparatus include an abnormality (to be referred to as a security abnormality hereinafter) caused by an attack from the outside (for example, transmission of an unauthentic message) and an abnormality (to be referred to as a safety abnormality hereinafter) caused by an abnormality that occurs in a vehicle (for example, a hazard). Japanese Patent No. 6761793 discloses a technique of, when an abnormality occurs in a self-navigating vehicle, discriminately detecting the abnormality as an abnormality belonging to the security abnormality or an abnormality belonging to the safety abnormality and deciding control and function limits of the self-navigating vehicle depending on the type of the abnormality.

However, there exist several problems in the conventional methods. In the technique disclosed in Japanese Patent No. 6465278, only vehicles on the periphery are notified of an abnormality regardless of the type of the abnormality. Hence, a partner that does not exist on the periphery but is desirable to make the notification cannot be notified of the abnormality.

In the technique disclosed in Japanese Patent Laid-Open No. 2008-77320, since the communication output is made largely independently of the type of an abnormality, even a vehicle whose driving is not affected is notified of the abnormality, resulting in an increase in the communication amount and the processing load on the receiving side.

In the technique disclosed in Japanese Patent No. 6761793, an occurrence of each of a security abnormality and a safety abnormality is detected, and how to handle the abnormality is decided. However, the handling is associated with vehicle control of the self-navigating vehicle. Notification to the outside of the self-navigating vehicle is not disclosed, and it is impossible to make an appropriate notification to the outside in accordance with the type of abnormality.

SUMMARY OF THE INVENTION

The present invention provides a technique for enabling an appropriate notification of an abnormality that has occurred.

According to the first aspect of the present invention, there is provided a notification apparatus comprising: a detection unit configured to detect an abnormality in a mounting apparatus with the notification apparatus mounted therein; and a notification unit configured to notify an external notification destination decided in accordance with the abnormality detected by the detection unit of the abnormality.

According to the second aspect of the present invention, there is provided a notification method performed by a notification apparatus, the method comprising: detecting an abnormality in a mounting apparatus with the notification apparatus mounted therein; and notifying an external notification destination decided in accordance with the detected abnormality of the abnormality.

According to the third aspect of the present invention, there is provided a non-transitory computer-readable storage medium for storing a computer program configured to cause a computer of a notification apparatus to function as: a detection unit configured to detect an abnormality in a mounting apparatus with the notification apparatus mounted therein; and a notification unit configured to notify an external notification destination decided in accordance with the abnormality detected by the detection unit of the abnormality.

Further features of the present invention will become apparent from the following description of exemplary embodiments with reference to the attached drawings.

BRIEF DESCRIPTION OF THE DRAWINGS

FIG. 1 is a block diagram showing an example of the functional configuration of a notification apparatus 10;

FIG. 2 is a view showing an example of the configuration of an abnormality notification message;

FIG. 3A-a is a view showing an example of the contents of attribute information 201 and data 202 for each abnormality type;

FIG. 3A-b is a view showing an example of the contents of attribute information 201 and data 202 for each abnormality type;

FIG. 3B-a is a view showing an example of the contents of attribute information 201 and data 202 for each abnormality type;

FIG. 3B-b is a view showing an example of the contents of attribute information 201 and data 202 for each abnormality type;

FIG. 3C-a is a view showing an example of the contents of attribute information 201 and data 202 for each abnormality type;

FIG. 3C-b is a view showing an example of the contents of attribute information 201 and data 202 for each abnormality type;

FIG. 3D-a is a view showing an example of the contents of attribute information 201 and data 202 for each abnormality type;

FIG. 3D-b is a view showing an example of the contents of attribute information 201 and data 202 for each abnormality type;

FIG. 5 is a flowchart of processing performed by the notification apparatus 10 to notify the outside of an abnormality;

FIG. 6 is a view showing an example of the configuration of an abnormality notification message;

FIG. 7A-al is a view showing an example of the contents of attribute information 201, a notification target 205, and data 202 for each abnormality type;

FIG. 7A-a2 is a view showing an example of the contents of attribute information 201, a notification target 205, and data 202 for each abnormality type;

FIG. 7A-b1 is a view showing an example of the contents of attribute information 201, a notification target 205, and data 202 for each abnormality type;

FIG. 7A-b2 is a view showing an example of the contents of attribute information 201, a notification target 205, and data 202 for each abnormality type;

FIG. 7B-al is a view showing an example of the contents of attribute information 201, a notification target 205, and data 202 for each abnormality type;

FIG. 7B-a2 is a view showing an example of the contents of attribute information 201, a notification target 205, and data 202 for each abnormality type;

FIG. 7B-b1 is a view showing an example of the contents of attribute information 201, a notification target 205, and data 202 for each abnormality type;

FIG. 7B-b2 is a view showing an example of the contents of attribute information 201, a notification target 205, and data 202 for each abnormality type;

FIG. 8 is a flowchart of processing performed by a notification apparatus 10 to notify the outside of an abnormality;

FIG. 10A-a is a view showing an example of the contents of attribute information 201 and data 202 for each abnormality type;

FIG. 10A-b is a view showing an example of the contents of attribute information 201 and data 202 for each abnormality type;

FIG. 10B-a is a view showing an example of the contents of attribute information 201 and data 202 for each abnormality type;

FIG. 10B-b is a view showing an example of the contents of attribute information 201 and data 202 for each abnormality type;

FIG. 10C-a is a view showing an example of the contents of attribute information 201 and data 202 for each abnormality type;

FIG. 10C-b is a view showing an example of the contents of attribute information 201 and data 202 for each abnormality type;

FIG. 12A-al is a view showing an example of the contents of attribute information 201, a notification target 205, and data 202 for each abnormality type;

FIG. 12A-a2 is a view showing an example of the contents of attribute information 201, a notification target 205, and data 202 for each abnormality type;

FIG. 12A-b is a view showing an example of the contents of attribute information 201, a notification target 205, and data 202 for each abnormality type;

FIG. 12B-1 is a view showing an example of the contents of attribute information 201, a notification target 205, and data 202 for each abnormality type;

FIG. 12B-2 is a view showing an example of the contents of attribute information 201, a notification target 205, and data 202 for each abnormality type.

DESCRIPTION OF THE EMBODIMENTS

Figure 4:
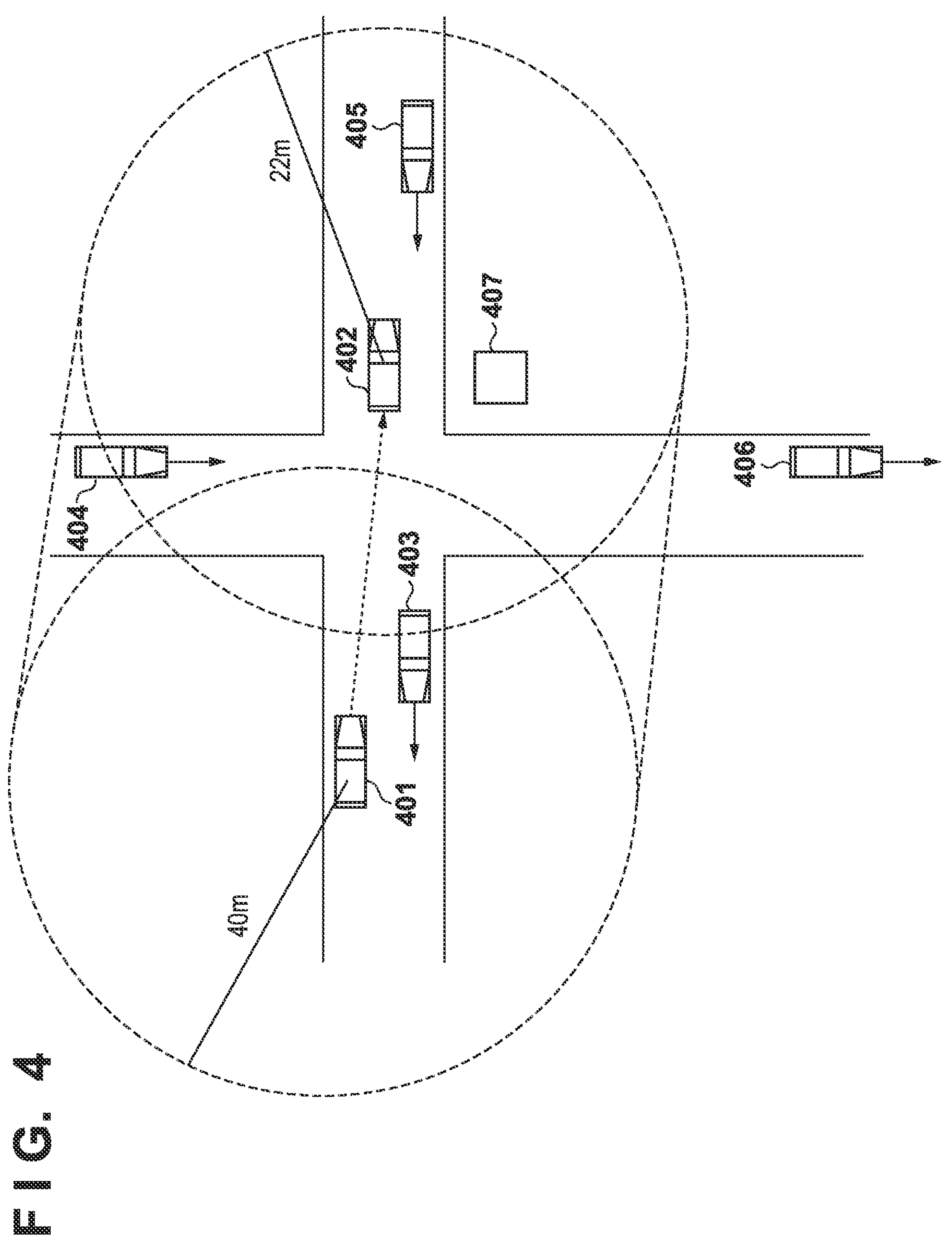
FIG. 4 is a view showing an example of the range of a notification in a case where loss of a brake function has occurred as a safety abnormality.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In this embodiment, a case where a vehicle and a road side machine represent a moving object and a fixed communication apparatus, respectively, will be described. Each one of the vehicle and road-side machine is provided with a notification apparatus mounted therein, as will be described below. The notification apparatus according to this embodiment detects an abnormality in a mounting apparatus (in this embodiment, the vehicle or the road side machine) with the notification apparatus mounted therein, decides a notification destination of the abnormality in accordance with the detected abnormality, and notifies the decided notification destination of the abnormality.

An example of the functional configuration of a notification apparatus 10 according to this embodiment will be described first with reference to the block diagram of FIG. 1. Note that FIG. 1 shows both function units that operate in the notification apparatus mounted in the vehicle and function units that operate in the notification apparatus mounted in the road side machine.

An abnormality detection unit 103 detects an abnormality (information concerning an abnormality such as the type of an abnormality, contents, and the occurrence position of an abnormality) in a mounting apparatus 1 (in this embodiment, the vehicle or the road side machine) with the notification apparatus 10 mounted therein. To enable detection of various kinds of abnormalities, the abnormality detection unit 103 includes a first abnormality detection unit 106, a second abnormality detection unit 107, a third abnormality detection unit 108, and a fourth abnormality detection unit 109.

The first abnormality detection unit 106 monitors a message received from a communication path inside the mounting apparatus 1 or a vehicle (or another vehicle if the mounting apparatus 1 is a vehicle), data to be stored, or the like and detects an abnormality associated with security as a security abnormality. For example, the first abnormality detection unit 106 detects, as a security abnormality, alteration of a message detected by a Message Authentication Code (MAC) that is an authentication code. Also, for example, the first abnormality detection unit 106 detects, as a security abnormality, malware invasion detected by an anti-malware function using machine learning.

The second abnormality detection unit 107 monitors the operation of a function of the mounting apparatus 1 and detects an abnormality of the operation as a safety abnormality. For example, the second abnormality detection unit 107 includes a mechanism configured to make redundant power supply circuits in the mounting apparatus 1 and compare output voltages, and detects an unexpected power loss as a safety abnormality.

The third abnormality detection unit 108 monitors external world information acquired (measured) by sensors such as a camera, a Light Detection and Ranging (LiDAR), and a radar mounted in the mounting apparatus 1. The third abnormality detection unit 108 then detects, from the external world information, an abnormality that affects control of the vehicle because of an event that has occurred in the external world as a traffic abnormality. For example, upon recognizing a load fallen on a road or a traffic accident that has occurred at an intersection from a video captured by the camera, the third abnormality detection unit 108 detects the result of the recognition as a traffic abnormality. Also, upon recognizing a vehicle such as a speeding vehicle committing a traffic offense from a video captured by the camera, the third abnormality detection unit 108 detects the result (for example, the speed and identification information of the speeding vehicle) of the recognition as a traffic abnormality. Alternatively, the third abnormality detection unit 108 may detect a traffic abnormality from a measurement result obtained by a sensor mounted in the mounting apparatus 1.

The fourth abnormality detection unit 109 is a function unit provided in the notification apparatus 10 mounted in a moving object (in this embodiment, a vehicle) and is a function unit that is not provided in the notification apparatus 10 mounted in a road side machine. The fourth abnormality detection unit 109 monitors the state of the operator of the vehicle by various kinds of sensors (an in-vehicle camera (a camera that captures the interior of a vehicle), a pulse sensor, a breath sensor, and the like) provided in the vehicle, and detects a state in which the operator cannot continue driving of the vehicle as an operator abnormality. For example, the face of the operator is detected and monitored by the in-vehicle camera. Upon recognizing, from a video obtained by the in-vehicle camera, a state in which the operator closes the eyes for a long time, the fourth abnormality detection unit 109 determines this as drowsy driving and detects that an operator abnormality has occurred. Alternatively, if the pulse of the operator is detected by the pulse sensor, and upon detecting a stop of the pulse, the fourth abnormality detection unit 109 determines this as loss of consciousness, and detects that an operator abnormality has occurred. An operator abnormality may be detected by another sensor mounted in the vehicle.

A determination unit 105 is a function unit provided in the notification apparatus 10 mounted in a moving object (in this embodiment, a vehicle) and is a function unit that is not provided in the notification apparatus 10 mounted in a road side machine. Based on an abnormality detected by the abnormality detection unit 103, and measurement results obtained by the various kinds of sensors (an in-vehicle camera and an out-of-vehicle camera (a camera that captures the exterior of a vehicle), a LiDAR, a speed sensor, an acceleration sensor, a rotation sensor, a tire air pressure sensor, and the like) mounted in the vehicle, the determination unit 105 determines whether the vehicle can continue normal vehicle control. For example, if the second abnormality detection unit 107 detects a safety abnormality "a fault of losing the power steering function of the vehicle has occurred", the determination unit 105 determines that there is a moving object control influence. Also, for example, if the third abnormality detection unit 108 detects a traffic abnormality "the LiDAR has broken down, the fault cannot be covered by another function such as a camera, and the periphery cannot be confirmed", the determination unit 105 determines that there is a moving object control influence. In addition, the determination unit 105 may determine the presence/absence of a moving object control influence based on a road state on the periphery recognized from a video captured by the out-of-vehicle camera, the speed of the vehicle measured by the speed sensor, the acceleration of the vehicle measured by the acceleration sensor, the state of the steering wheel measured by an appropriate sensor, and the like. For example, upon determining, as the results of measurement by these sensors, that the vehicle is traveling on a road with a curve at such a speed that the vehicle cannot turn or stop safe without a power steering function, the determination unit 105 determines that there is a moving object control influence.

As described above, upon determining that the vehicle cannot continue normal vehicle control, the determination unit 105 determines that there is a moving object control influence. Upon determining that the vehicle can continue normal vehicle control, the determination unit 105 determines that there is no moving object control influence.

A determination unit 104 determines (e.g., decides) the notification destination of an abnormality based on an abnormality detected by the abnormality detection unit 103 or the result of determination of the determination unit 105 (e.g., the presence/absence of a moving object control influence). Notification destinations of an abnormality are roughly classified into one or more partners (e.g., an element which may be associated with, and/or connectable to, the vehicle). Each partner may represent, for example, a vehicle (i.e., another vehicle) or a road side machine. The partners may exist in a range (a first area (e.g., narrow area)) based on geographical information representing a geographical position, such as a latitude, a longitude, and a distance. The partners may each exist in a range (a second area (e.g., wide area)) not based on geographical information and can be specified by an IP address or the like (e.g., partners can be specified by a network address such as an IP address on a network to which the mounting apparatus 1 is connected).

If the determination unit 105 determines that there is a moving object control influence, this may affect the safety of vehicles on the periphery (e.g., a periphery of an area affected by the abnormality). Hence, the determination unit 104 determines partners in the narrow area (for example, other vehicles and road side machines, which exist within a predetermined range from a path through which the vehicle is predicted to pass based on a video captured by the out-of-vehicle camera or a speed measured by a speed sensor) as the notification destination of the abnormality.

Also, even if the determination unit 105 does not determine that there is a moving object control influence, or even if a road side machine includes the notification apparatus 10 that is not provided with the determination unit 105, the notification destination of an abnormality can sometimes be determined in accordance with an abnormality detected by the abnormality detection unit 103. For example, if the first abnormality detection unit 106 detects a security abnormality derived from an external attack, the determination unit 105 determines a management center that collects information and can be specified by an IP address as the notification destination of the abnormality.

If the determination unit 105 determines that there is a moving object control influence, the determination unit 104 determines both the partners in the narrow area and the partners in the wide area as the notification destination. If the determination unit 105 does not determine that there is a moving object control influence, the determination unit 104 determines the partners in the wide area as the notification destination.

A generation unit 102 generates an abnormality notification message based on the abnormality detected by the abnormality detection unit 103, the result of determination of the determination unit 105 (the presence/absence of a moving object control influence), the notification destination of the abnormality determined by the determination unit 104, and the like.

FIG. 2 shows an example of the configuration of the abnormality notification message. Attribute information 201 includes information for identifying the notification source (transmission source) of the abnormality notification message, information representing the type of the abnormality detected by the abnormality detection unit 103 (abnormality type), and information representing the presence/absence of a moving object control influence. The "information representing the type of the abnormality detected by the abnormality detection unit 103" is information representing one of a security abnormality, a safety abnormality, and a traffic abnormality, including an operator abnormality if the transmission source is a vehicle.

Data 202 is main information concerning the abnormality based on the information of the abnormality detected by the abnormality detection unit 103, and its contents change depending on the type of the abnormality detected by the abnormality detection unit 103, the transmission source of the abnormality notification message, the presence/absence of a moving object control influence determined by the determination unit 105, and the like.

A certificate 203 is information of a route certificate representing authenticity of the transmission source of the abnormality notification message. A signature 204 is information that proves that the abnormality notification message is not altered.

Examples of the contents of the attribute information 201 and the data 202 for each type of an abnormality detected by the abnormality detection unit 103 (abnormality type) will be described with reference to FIGS. 3A-a to 3D-b. The generation unit 102 generates, for example, an abnormality notification message including the attribute information 201 and the data 202 according to rules shown in FIGS. 3A-a to 3D-b.

FIG. 3A-a shows an example of the attribute information 201 and the data 202 in a case where the abnormality detection unit 103 detects a security abnormality, and the determination unit 104 determines a partner in the narrow area as the notification destination of the abnormality notification message. FIG. 3A-b shows an example of the attribute information 201 and the data 202 in a case where the abnormality detection unit 103 detects a security abnormality, and the determination unit 104 determines a partner in the wide area as the notification destination of the abnormality notification message.

If the abnormality detection unit 103 detects a security abnormality, and the determination unit 104 determines a partner in the narrow area as the notification destination of the abnormality notification message, as shown in FIG. 3A-a, the attribute information 201 includes the type of the abnormality detected by the abnormality detection unit 103 (abnormality type), transmission source identification information representing the transmission source of the abnormality notification message, and moving object control influence information representing the result of determination of the determination unit 105 (the presence/absence of a moving object control influence). As will be described later, the contents of the data 202 change depending on the abnormality type and the presence/absence of a moving object control influence. Hence, the abnormality type and the moving object control influence information are included in the attribute information 201, and the attribute information 201 is confirmed on the receiving side, thereby determining the contents of the data 202 received together with the attribute information 201.

The data 202 includes, as information used by other vehicles, road side machines, and pedestrians to determine the influence on safety, the contents of the abnormality detected by the abnormality detection unit 103 (abnormality contents) and the position where the abnormality has occurred (abnormality occurrence position). If the transmission source of the abnormality notification message is a vehicle, an accident may occur depending on the course of the vehicle after the occurrence of the security abnormality. For this reason, the data 202 includes, as information necessary for determining the course, moving object operation information including a speed, an acceleration, a control state, and movement prediction information. The control state represents vehicle control such as stopped, traveling, and ON/OFF of a brake or an accelerator, and the movement prediction information represents the arrival time and position of the vehicle assumed from the position, the speed, and the acceleration of the vehicle, and the states of the steering wheel, the brake, and the accelerator. For example, if the control state of the vehicle includes "stopped" and "brake ON", that is, if the vehicle does not move from the abnormality occurrence position, the movement prediction information is blank, as shown in FIG. 3A-a. Also, if the transmission source of the abnormality notification message is a road side machine, the road side machine does not move, and therefore, the speed, the acceleration, the control state, and the movement prediction information in the abnormality notification message generated in the road side machine are blank. The receiving side that has received the abnormality notification message determines, based on these pieces of information included in the abnormality notification message, whether the contents affect the position of the receiver itself, and vehicle control or a notification to the user is performed not to cause an accident.

If the abnormality detection unit 103 detects a security abnormality, and the determination unit 104 determines a partner in the wide area as the notification destination of the abnormality notification message, as shown in FIG. 3A-b, the attribute information 201 includes an abnormality type, transmission source identification information, and moving object control influence information. Also, the data 202 includes, as information necessary for analyzing the vulnerability of a vehicle or a road side machine and specifying a partner that suffers the same attack, the contents of the abnormality detected by the abnormality detection unit 103 (abnormality contents), the position where the abnormality has occurred (abnormality occurrence position), model information, sensor information, and software version information. Also, if the attacker can be specified, the data 202 includes attacker identification information such as the ID of the attacker to notify other vehicles and road side machines to the existence of the attacker. If the attacker cannot be specified, or there is no identifiable information, the attacker identification information is blank, as shown in FIG. 3A-b. The model information is information representing the model of the apparatus of the transmission source of the abnormality notification message, the sensor information is information representing the type of a sensor, and software version information is information representing the version of software in the apparatus. The abnormality notification message receiving side can determine, based on the abnormality occurrence position and the software version information, a partner that has a high probability of suffering the same attack, and analyze the vulnerability and cope with the attack by, for example, neglecting a message from a vehicle specified by the attacker identification information based on the abnormality contents, the model information, the sensor information, and the like.

FIG. 3B-a shows an example of the attribute information 201 and the data 202 in a case where the abnormality detection unit 103 detects a safety abnormality, and the determination unit 104 determines a partner in the narrow area as the notification destination of the abnormality notification message. FIG. 3B-b shows an example of the attribute information 201 and the data 202 in a case where the abnormality detection unit 103 detects a safety abnormality, and the determination unit 104 determines a partner in the wide area as the notification destination of the abnormality notification message.

If the abnormality detection unit 103 detects a safety abnormality, and the determination unit 104 determines a partner in the narrow area as the notification destination of the abnormality notification message, as shown in FIG. 3B-a, the data 202 includes abnormality contents and an abnormality occurrence position as information used by other vehicles, pedestrians, and the like to determine the influence on safety, like the security abnormality. If the transmission source of the abnormality notification message is a vehicle, the data 202 includes moving object operation information including a speed, an acceleration, a control state, and movement prediction information. Also, like the security abnormality, to determine the contents of the data 202, the attribute information 201 includes an abnormality type, transmission source identification information, and moving object control influence information.

If the abnormality detection unit 103 detects a safety abnormality, and the determination unit 104 determines a partner in the wide area as the notification destination of the abnormality notification message, as shown in FIG. 3B-b, the data 202 includes abnormality contents and an abnormality occurrence position as information necessary for analyzing the possibility of a function fault in a vehicle or a road side machine. If the transmission source of the abnormality notification message is a vehicle, the data 202 includes a speed, an acceleration, and a control state in order to consider under what driving conditions the abnormality has occurred. The receiving side performs analysis of the function fault based on the abnormality contents, the speed, the acceleration, the control state, and the like to prepare for a recall or the like. Also, like the security abnormality, to determine the contents of the data 202, the attribute information 201 includes an abnormality type, transmission source identification information, and moving object control influence information.

FIG. 3C-a shows an example of the attribute information 201 and the data 202 in a case where the abnormality detection unit 103 detects a traffic abnormality, and the determination unit 104 determines a partner in the narrow area as the notification destination of the abnormality notification message. FIG. 3C-b shows an example of the attribute information 201 and the data 202 in a case where the abnormality detection unit 103 detects a traffic abnormality, and the determination unit 104 determines a partner in the wide area as the notification destination of the abnormality notification message.

If the abnormality detection unit 103 detects a traffic abnormality, and the determination unit 104 determines a partner in the narrow area as the notification destination of the abnormality notification message, as shown in FIG. 3C-a, the data 202 includes abnormality contents and an abnormality occurrence position as information used by other vehicles, pedestrians, and the like to determine the influence on safety, like the security abnormality. If the transmission source of the abnormality notification message is a vehicle, the data 202 includes moving object operation information including a speed, an acceleration, a control state, and movement prediction information. If the traffic abnormality affects control of the self-navigating vehicle, the moving object operation information is added to notify the operation or the predicted path of the self-navigating vehicle. Another vehicle that has received the abnormality notification message determines the operation of the vehicle based on the moving object operation information and performs control for avoiding the predicted path not to cause an accident. Also, if the traffic abnormality is an abnormality associated with an offending vehicle, the data 202 includes traffic abnormality information including the speed of the offending vehicle (offending vehicle speed) and identification information for identifying the offending vehicle (offending vehicle identification information). If the traffic abnormality is an abnormality not associated with an offending vehicle, the offending vehicle speed and the offending vehicle identification information are blank, as shown in FIG. 3C-a. The receiving side determines, based on these pieces of information, whether the contents affect the position of the receiver itself, and vehicle control or a notification to the user is performed not to cause an accident. Also, like the security abnormality, to determine the contents of the data 202, the attribute information 201 includes an abnormality type, transmission source identification information, and moving object control influence information.

If the abnormality detection unit 103 detects a traffic abnormality, and the determination unit 104 determines a partner in the wide area as the notification destination of the abnormality notification message, as shown in FIG. 3C-b, the data 202 includes abnormality contents and an abnormality occurrence position as information used by a partner that handles the traffic abnormality to examine the handling. If the traffic abnormality is an abnormality associated with an offending vehicle, the data 202 includes traffic abnormality information including an offending vehicle speed and offending vehicle identification information as information used by the partner that handles the traffic abnormality to examine the handling. If the traffic abnormality is an abnormality not associated with an offending vehicle, the offending vehicle speed and the offending vehicle identification information are blank, as shown in FIG. 3C-b. Also, like the security abnormality, to determine the contents of the data 202, the attribute information 201 includes an abnormality type, transmission source identification information, and moving object control influence information.

FIG. 3D-a shows an example of the attribute information 201 and the data 202 in a case where the abnormality detection unit 103 detects an operator abnormality, and the determination unit 104 determines a partner in the narrow area as the notification destination of the abnormality notification message. FIG. 3D-b shows an example of the attribute information 201 and the data 202 in a case where the abnormality detection unit 103 detects an operator abnormality, and the determination unit 104 determines a partner in the wide area as the notification destination of the abnormality notification message.

If the abnormality detection unit 103 detects an operator abnormality, and the determination unit 104 determines a partner in the narrow area as the notification destination of the abnormality notification message, as shown in FIG. 3D-a, the data 202 includes abnormality contents and an abnormality occurrence position as information used by a partner that handles the operator abnormality to examine the handling. Furthermore, the data 202 includes moving object operation information including a speed, an acceleration, a control state, and movement prediction information. Also, like the security abnormality, to determine the contents of the data 202, the attribute information 201 includes an abnormality type, transmission source identification information, and moving object control influence information.

If the abnormality detection unit 103 detects an operator abnormality, and the determination unit 104 determines a partner in the wide area as the notification destination of the abnormality notification message, as shown in FIG. 3D-b, the data 202 includes abnormality contents and an abnormality occurrence position. Also, like the security abnormality, to determine the contents of the data 202, the attribute information 201 includes an abnormality type, transmission source identification information, and moving object control influence information.

Note that the configurations of the data 202 and the attribute information 201 shown in FIGS. 3A-a to 3D-b are merely examples. For example, the data 202 and the attribute information 201 may include other information in place of or in addition to the information shown in FIGS. 3A-a to 3D-b.

Referring back to FIG. 1, a notification unit 101 notifies (transmits) the abnormality notification message generated by the generation unit 102 to the notification destination determined by the determination unit 104. The notification unit 101 includes a wide area communication unit 110 and a narrow area communication unit 111.

The narrow area communication unit 111 notifies a notification destination determined as a partner in the narrow area by the determination unit 104 of the abnormality notification message. The narrow area communication unit 111 performs the notification of the abnormality notification message using a communication method capable of notifying a vehicle or a road side machine existing in one intersection of the abnormality notification message. For example, the narrow area communication unit 111 performs the notification of the abnormality notification message using Dedicated Short Range Communication (DSRC) capable of performing communication within the range of several to several tens of m using the 5.8-GHz band. This method is widely used, but a communication method capable of performing communication in another narrow area may be used.

The wide area communication unit 110 notifies a notification destination determined as a partner in the wide area by the determination unit 104 of the abnormality notification message. The wide area communication unit 110 notifies a partner in a notification range wider than the notification range of the narrow area communication unit 111 of the abnormality notification message via a base station from the mounting apparatus 1. For example, the wide area communication unit 110 performs the notification of the abnormality notification message using a cellular communication network or the like. This method is widely used, but a communication method capable of performing communication in another wide area may be used.

In this embodiment, a partner existing in a range (narrow area) based on geographical information is notified of the abnormality notification message using the narrow area communication unit 111. Also, in this embodiment, a partner that exists outside the range of the narrow area and can be specified by an IP address or the like not based on geographical information is notified of the abnormality notification message using the wide area communication unit 110.

If a security abnormality occurs, it may affect vehicles and road side machines existing in remote sites. For example, a vehicle or a road side machine of the same software version as that of the mounting apparatus in which the security abnormality has occurred may suffer the same attack as the mounting apparatus. For this reason, if a security abnormality has occurred in a mounting apparatus, the determination unit 104 determines a maker or the like as the notification destination and decides the IP address of the notification destination, and the wide area communication unit 110 transmits an abnormality notification message to the notification destination of the IP address. On the maker side, a partner to be attacked at a high possibility is determined based on abnormality contents and an abnormality occurrence position included in the abnormality notification message, model information, sensor information, and software version information, and a notification is made. For example, if the abnormality contents in a vehicle of interest indicate "authority promotion upon taking advantage of vulnerability of the software version", even a vehicle having the same software version information as the software version information of the vehicle of interest may be attacked because of the vulnerability. Hence, the vehicle of interest notifies the maker of an abnormality notification message including the software version information of the vehicle of interest using the wide area communication unit 110. The maker sends an abnormality notification message to each vehicle having the same software version information as the software version information included in the received abnormality notification message, thereby urging the vehicle to take a measure such as updating of software.

In addition, if a security abnormality occurs, an apparatus that collects information about the security abnormality may also be decided as the notification destination of the abnormality notification message. For example, the determination unit 104 determines, as the notification destination, a management center that collects log data of a vehicle, measurement results obtained by sensors, information about an abnormality, and the like and performs analysis and handling, and decides the IP address of the management center. Then, the wide area communication unit 110 notifies the management center of the IP address via a base station of an abnormality notification message configured to notify the security abnormality. The management center analyzes vulnerability based on abnormality contents and an abnormality occurrence position included in the abnormality notification message, model information, sensor information, and software version information. The notification destination of the abnormality notification message by the wide area communication unit 110 is determined in advance by the maker, the vehicle model, the security service company, and the like, and a notification is made when a security abnormality occurs.

If a safety abnormality occurs, an apparatus that collects information about the safety abnormality may also be decided as the notification destination of the abnormality notification message. For example, the determination unit 104 determines, as the notification destination, a maker that collects function fault information of vehicles and conducts a recall or a management center, like the security abnormality, and decides the IP address of the notification destination. Then, the wide area communication unit 110 notifies the notification destination of the IP address via a base station of an abnormality notification message configured to notify the safety abnormality. The maker or the management center accumulates function fault information based on abnormality contents, and in a case of a vehicle, a speed, an acceleration, a control state, and the like and analyzes the fault. The notification destination of the abnormality notification message by the wide area communication unit 110 is determined in advance by the maker, the vehicle model, and the like, and a notification is made when a safety abnormality occurs.

If a traffic abnormality occurs, the wide area communication unit 110 notifies a partner that handles the traffic abnormality in accordance with the contents of the traffic abnormality. For example, if the contents of the traffic abnormality indicate the existence of a speeding vehicle, it is preferable to notify the existence of the offending vehicle. Hence, the determination unit 104 determines a police station that controls the offending vehicle as the notification destination, and decides the IP address of the police station. Then, the wide area communication unit 110 notifies the police station of the IP address via a base station of an abnormality notification message configured to notify the existence of the offending vehicle. In addition, if the contents of the traffic abnormality indicate an abnormality of a road state such as a crack, the determination unit 104 determines a fire station as the notification destination because it is necessary to confirm the state of the road and make handling, and decides the IP address of the fire station. Then, the wide area communication unit 110 notifies the fire station of the IP address via a base station of an abnormality notification message configured to notify the abnormality of the road state. The police station or the fire station on the receiving side collects abnormality contents, an abnormality occurrence position, offending vehicle identification information, and the like and examines handling in consideration of information from other vehicles as well.

If an operator abnormality occurs, the wide area communication unit 110 notifies a partner that exists in the wide area and handles the operator abnormality in accordance with the state of the operator. For example, if the contents of the operator abnormality indicate cardiac arrest, it is preferable to handle it as soon as possible. Hence, the determination unit 104 determines a hospital or a fire station as the notification destination, and decides the IP address of the notification destination. Then, the wide area communication unit 110 notifies the notification destination of the IP address via a base station of an abnormality notification message configured to notify the operator abnormality. If the contents of the operator abnormality indicate drunk driving or drowsy driving, the determination unit 104 determines a police station as the notification destination because it is a tort under the Road Traffic Act, and decides the IP address of the notification destination. Then, the wide area communication unit 110 notifies the notification destination of the IP address via a base station of an abnormality notification message configured to notify the operator abnormality. The hospital or the police station on the receiving side ascertains the condition of the operator from the abnormality contents or the abnormality occurrence position and examines dispatch of an ambulance, on-site confirmation, or the like.

Furthermore, if the determination unit 105 determines, regardless of the type of an abnormality, that there is a moving object control influence, it may be impossible to control the self-navigating vehicle or a road side machine, and the abnormality may affect the periphery. Hence, based on geographical information representing the affected range, the determination unit 104 determines vehicles, road side machines, and pedestrians (terminals held by pedestrians) existing in the range as notification targets. In this case, the determination unit 104 determines a predicted arrival position based on the abnormality contents and the abnormality occurrence position in the data 202 and the moving object operation information including a speed, an acceleration, a control state, and movement prediction information. The notification range is expressed by geographical information. The narrow area communication unit 111 notifies the vehicles, the road side machines, and the pedestrians (the terminals held by the pedestrians) in the determined notification range of an abnormality notification message. For example, if DSRC is used as the narrow area communication unit 111, the size of the notification range is decided by controlling the output.

FIG. 4 is a view showing an example of the range of a notification in a case where loss of a brake function has occurred as a safety abnormality. A vehicle 401 that has lost the brake function is uncontrollable and is predicted to arrive at the position of a vehicle 402. At this time, the determination unit 104 determines, as the notification destination, partners existing in a range less than a predetermined distance from the range through which the vehicle passes from the position where the safety abnormality of the vehicle 401 is detected (abnormality occurrence position) up to the predicted arrival position represented by the movement prediction information. In this example, the range of a circle with a radius of 22 m that is the stop distance at a speed limit of 40 km is determined as the range of the notification. In this case, the output of DSRC is controlled, thereby notifying the range of 22 m from the self-navigating vehicle of the safety abnormality. Thus, the vehicles 402 to 405 and a road side machine 407, which exist within the range of the notification, are notified of the safety abnormality.

Note that the above-described notification target determination is merely an example, and the target or range to notify the abnormality may be determined using information that can be acquired by the self-navigating vehicle or information that can be acquired from other vehicles or road side machines. Processing performed by the notification apparatus 10 to notify the outside of an abnormality will be described next with reference to a flowchart shown in FIG. 5.

In step S501, the abnormality detection unit 103 performs detection processing of detecting the occurrence of an abnormality. The process of step S501 is a process executed by the notification apparatus 10 mounted in a vehicle but not a process executed by the notification apparatus 10 mounted in a road side machine. In step S502, the determination unit 105 determines, based on the abnormality detected by the abnormality detection unit 103 in step S501 and measurement results obtained by various kinds of sensors mounted in the vehicle, whether the vehicle can continue normal vehicle control.

In step S503, the determination unit 104 determines (decides) the notification destination (notification target) of the abnormality based on the abnormality detected by the abnormality detection unit 103 in step S501 and the result of determination of the determination unit 105 in step S502 (the result is not used by the notification apparatus 10 mounted in a road side machine).

In step S504, the generation unit 102 generates an abnormality notification message having the configuration shown in FIG. 2 based on the abnormality detected by the abnormality detection unit 103 in step S501, the result of determination of the determination unit 105 in step S502 (the result is not used by the notification apparatus 10 mounted in a road side machine), and the notification destination of the abnormality determined by the determination unit 104 in step S503.

The processes of steps S505 and S506 are processes executed by the notification apparatus 10 mounted in a vehicle but not processes executed by the notification apparatus 10 mounted in a road side machine.

In step S505, the notification unit 101 determines whether the result of determination of the determination unit 105 in step S502 is "presence of a moving object control influence". If it is determined that the result of determination of the determination unit 105 in step S502 is "presence of a moving object control influence", the process advances to step S506. On the other hand, if the result of determination of the determination unit 105 in step S502 is not "presence of a moving object control influence", the process advances to step S507.

In step S506, the narrow area communication unit 111 notifies each partner in the narrow area determined by the determination unit 104 as the notification destination in step S503 of the abnormality notification message for partners in the narrow area, which is generated in step S504.

If the type of the abnormality detected in step S501 is a security abnormality, the process advances to step S508 via step S507. In step S508, the wide area communication unit 110 notifies each partner in the wide area determined by the determination unit 104 as the notification destination in step S503 (a maker that makes a notification to a partner that may be attacked, or a partner that collects information about a security abnormality) of the abnormality notification message for partners in the wide area.

If the type of the abnormality detected in step S501 is a safety abnormality, the process advances to step S509 via step S507. In step S509, the wide area communication unit 110 notifies each partner in the wide area determined by the determination unit 104 as the notification destination in step S503 (a partner that collects information about a safety abnormality) of the abnormality notification message for partners in the wide area.

If the type of the abnormality detected in step S501 is a traffic abnormality or an operator abnormality, the process advances to step S510 via step S507. In step S510, the wide area communication unit 110 notifies each partner in the wide area determined by the determination unit 104 as the notification destination in step S503 (a partner that handles the abnormality) of the abnormality notification message for partners in the wide area.

Note that in the flowchart shown in FIG. 5, the processes of steps S508 to S510 are executed after the process of step S506. However, the order is not limited to this. That is, the processes of steps S508 to S510 may be executed before the process of step S506, or the processes of steps S508 to S510 and the process of step S506 may be executed concurrently.

By performing this processing, if an abnormality occurs in the mounting apparatus 1 with the notification apparatus 10 mounted therein, the notification apparatus 10 can change the notification destination of the abnormality in accordance with the type of the abnormality.

Note that in this embodiment, when notifying the wide area of an abnormality that has occurred in a vehicle, the wide area communication unit 110 of the notification apparatus 10 mounted in the vehicle makes the notification. However, the narrow area communication unit 111 of the notification apparatus 10 mounted in the vehicle may notify a road side machine near the vehicle of the abnormality, and the wide area communication unit 110 of the road side machine may notify the wide area of the abnormality.

In Japanese Patent No. 6465278, at the time of abnormality occurrence, other vehicles on the periphery of the self-navigating vehicle are notified of the occurrence of the abnormality. In the method of Japanese Patent No. 6465278, however, only the periphery is notified of the abnormality regardless of the type of the abnormality. Hence, it is sometimes impossible to make a notification to a partner that should be notified of the abnormality that has occurred.

Also, in the method of Japanese Patent Laid-Open No. 2008-77320, if a safety abnormality occurs in the self-navigating vehicle, the notification output is maximized, thereby reliably notifying other vehicles of the abnormality. Hence, depending on the type of the abnormality that has occurred, a notification is sent to a partner not to be affected, resulting in an increase of the processing load on the receiving side.

Furthermore, in the method of Japanese Patent No. 6761793, an abnormality that has occurred in the self-navigating vehicle is discriminately detected as a security abnormality or a safety abnormality, and control in the self-navigating vehicle is performed. In the method of Japanese Patent No. 6761793, however, only vehicle control of the self-navigating vehicle is performed, and a notification to the outside of the vehicle cannot be performed.

On the other hand, in this embodiment, the notification destination of an abnormality is changed in accordance with the type of the abnormality that has occurred in a vehicle or a road side machine. Hence, not only vehicles on the periphery but also a partner desirable to notify the abnormality can be notified of the abnormality.

According to this embodiment, the processing load of a partner not to be affected can be reduced by limiting the notification destination of an abnormality. Also, since an abnormality that has occurred in a vehicle can be notified to the outside of the vehicle, other vehicles can also handle the abnormality.

Note that in this embodiment, an abnormality is detected by estimating various events in a real space in accordance with measurement results obtained by sensors and the type of the abnormality. However, the estimation method is not limited to a specific method. In addition, the estimation processing may be performed by the notification apparatus 10 or an external apparatus.

In this embodiment, the notification destination of an abnormality notification message is an apparatus such as a partner in the narrow area or a partner in the wide area, or a range such as the narrow area or the wide area. The notification destination can be any of these and is not limited to those described above.

In this embodiment, a case where a security abnormality, a safety abnormality, a traffic abnormality, and an operator abnormality are used as the types of abnormalities to be detected has been described. However, the types of abnormalities to be detected are not limited to these.

<Modifications>

In the first embodiment, the determination unit 105 is a function unit provided in the notification apparatus 10 mounted in a moving object, and the notification apparatus 10 mounted in a road side machine does not have the function unit. However, the notification apparatus 10 mounted in a road side machine may include the determination unit 105.

For example, if the third abnormality detection unit 108 detects, based on a video of an intersection captured by a camera or measurement results obtained by various kinds of sensors, a vehicle with an offending speed (speeding vehicle) as a traffic abnormality in a range at a predetermined distance or less from the intersection, the determination unit 105 of the notification apparatus 10 mounted in a road side machine determines that the speeding vehicle cannot continue normal vehicle control (there is a moving object control influence). Thus, a case where a monitoring apparatus capable of monitoring a moving object determines, based on the monitoring result of the moving object, whether the moving object can perform normal movement control (in the first embodiment, a road side machine corresponds to the monitoring apparatus) can also be considered. Hence, in such a case, the notification apparatus 10 mounted in the monitoring apparatus may include the determination unit 105.

Second Embodiment

In the following embodiments including this embodiment, differences from the first embodiment will be described, and the embodiments are the same as in the first embodiment unless it is specifically stated otherwise.

In this embodiment, if a determination unit 104 determines a partner in a narrow area as the notification destination of an abnormality, a generation unit 102 generates information for specifying the partner in the narrow area and generates an abnormality notification message including the generated information.

FIG. 6 shows an example of the configuration of an abnormality notification message according to this embodiment. The configuration shown in FIG. 6 is obtained by adding a notification target 205 to the configuration shown in FIG. 2. The notification target 205 is information included in an abnormality notification message notified to a partner in a narrow area but not included in an abnormality notification message notified to a partner in a wide area. The notification target 205 is geographical information such as a latitude, a longitude, and a distance of the partner in the narrow area determined by the determination unit 104 as the notification destination.

Examples of the contents of attribute information 201, the notification target 205, and data 202 for each abnormality type in a case where a partner in the narrow area is determined as the notification destination will be described with reference to FIGS. 7A-a1, 7A-a2, 7A-b1, 7A-b2, 7B-a1, 7B-a2, 7B-b1, and 7B-b2. The contents of the attribute information 201 and the data 202 for each abnormality type in a case where a partner in the wide area is determined as the notification destination are the same as in the first embodiment.

FIGS. 7A-a1 and 7A-a2 show an example of the attribute information 201, the notification target 205, and the data 202 in a case where an abnormality detection unit 103 detects a security abnormality, and the determination unit 104 determines a partner in the narrow area as the notification destination of the abnormality notification message.

If the abnormality detection unit 103 detects a security abnormality, and the determination unit 104 determines a partner in the narrow area as the notification destination of the abnormality notification message, as shown in FIGS. 7A-a1 and 7A-a2, the attribute information 201 includes an abnormality type, transmission source identification information, and moving object control influence information, as in the first embodiment. The data 202 include abnormality contents and an abnormality occurrence position, as in the first embodiment. If the transmission source of the abnormality notification message is a vehicle, the data 202 includes moving object operation information including a speed, an acceleration, a control state, and movement prediction information, as in the first embodiment. The data 202 further includes model information, sensor information, and software version information. If an attacker can be specified, the data 202 includes attacker identification information.

The notification target 205 is the geographical information of the partner in the narrow area, as described above, and there exist several methods for expressing the geographical information. FIGS. 7A-a1, 7A-a2, 7A-b1, 7A-b2, 7B-a1, 7B-a2, 7B-b1, and 7B-b2 show a case where the notification target 205 is expressed by four or more latitudes and four or more longitudes, a case where the notification target 205 is expressed by one latitude, one longitude, and one horizontal distance, and a case where the notification target 205 is expressed by two latitudes, two longitudes, and one horizontal distance.

The notification target 205 expressed by the first method shows that a range surrounded by coordinates represented by four or more latitudes and four or more longitudes is the notification target (the partner in the narrow area). The notification target 205 expressed by the second method shows that a range in a circle having one latitude and one longitude as the center and having a predetermined horizontal distance as the radius is the notification target (the partner in the narrow area). The notification target 205 expressed by the third method shows that a range of a predetermined distance from a line that connects the coordinates of two latitudes and two longitudes is the notification target (the partner in the narrow area).

FIGS. 7A-b1 and 7A-b2 show an example of the attribute information 201, the notification target 205, and the data 202 in a case where the abnormality detection unit 103 detects a safety abnormality, and the determination unit 104 determines a partner in the narrow area as the notification destination of the abnormality notification message. The configuration shown in FIGS. 7A-b1 and 7A-b2 is obtained by adding the notification target 205 to the configuration shown in FIG. 3B-a.

FIGS. 7B-a1 and 7B-a2 show an example of the attribute information 201, the notification target 205, and the data 202 in a case where the abnormality detection unit 103 detects a traffic abnormality, and the determination unit 104 determines a partner in the narrow area as the notification destination of the abnormality notification message. The configuration shown in FIGS. 7B-a1 and 7B-a2 is obtained by adding the notification target 205 to the configuration shown in FIG. 3C-a.

FIGS. 7B-b1 and 7B-b2 show an example of the attribute information 201, the notification target 205, and the data 202 in a case where the abnormality detection unit 103 detects an operator abnormality, and the determination unit 104 determines a partner in the narrow area as the notification destination of the abnormality notification message. The configuration shown in FIGS. 7B-b1 and 7B-b2 is obtained by adding the notification target 205 to the configuration shown in FIG. 3D-a.

Note that the configurations of the attribute information 201, the notification target 205, and the data 202 shown in FIGS. 7A-a1, 7A-a2, 7A-b1, 7A-b2, 7B-a1, 7B-a2, 7B-b1, and 7B-b2 are merely examples. For example, the attribute information 201, the notification target 205, and the data 202 may include other pieces of information in place of or in addition to the information shown in FIGS. 7A-a1, 7A-a2, 7A-b1, 7A-b2, 7B-a1, 7B-a2, 7B-b1, and 7B-b2.

Note that a narrow area communication unit 111 may directly notify a partner existing in a range corresponding to geographical information of the abnormality notification message. For a range where the narrow area communication unit 111 cannot directly perform communication, the narrow area communication unit 111 may notify a vehicle or a road side machine on the periphery of the abnormality notification message. In this case, the vehicle or the road side machine that has received the abnormality notification message may refer to the notification target 205, and notify the partner by repeating transfer of the abnormality notification message such that the abnormality notification message is notified to a partner in a range corresponding to the notification target 205. More specifically, the vehicle or the road side machine that has detected an abnormality first notifies a vehicle or a road side machine on the periphery of the abnormality notification message including the notification target 205, as in the first embodiment. The vehicle or the road side machine that has received the abnormality notification message confirms the notification target 205 included in the abnormality notification message and confirms whether the self-navigating apparatus (e.g., self-navigating vehicle) exists in the range represented by the notification target 205. If the self-navigating apparatus exists outside the range represented by the notification target 205, it neglects the received abnormality notification message. On the other hand, if the self-navigating apparatus exists within the range represented by the notification target 205, the self-navigating apparatus confirms the received abnormality notification message, and the narrow area communication unit 111 of the self-navigating apparatus transfers the received abnormality notification message to a road side machine or a vehicle on the periphery. This operation is repeated, thereby notifying a partner in the range represented by the notification target 205 of the abnormality notification message via the vehicle or the road side machine.

If the abnormality type included in the attribute information 201 included in the abnormality notification message is a security abnormality, a wide area communication unit 110 notifies a partner specified by a predetermined IP address of the abnormality notification message via a base station, as in the first embodiment. Here, in a case of a security abnormality, for example, if the abnormality contents indicate reception of an unauthentic message from another vehicle, there is a possibility that the determination unit 104 can predict the driving path of an attacking vehicle based on the abnormality occurrence position, and the speed and the advancing direction of the attacking vehicle. In this case, since a vehicle or a road side machine existing in the predicted path may be attacked, corresponding latitude and longitude are included in the notification target 205. The narrow area communication unit 111 notifies the range represented by the notification target 205 of the abnormality notification message including the notification target 205 via a vehicle or a road side machine.

If the abnormality type included in the attribute information 201 included in the abnormality notification message is a traffic abnormality, the wide area communication unit 110 notifies a partner specified by a predetermined IP address of the abnormality notification message via a base station, as in the first embodiment. Here, in a case of a traffic abnormality, for example, if the abnormality contents indicate a fallen object on a road, there is a possibility that the determination unit 104 can decide, based on the abnormality occurrence position or the like, a range where the traveling path may be changed. In this case, since a vehicle existing in the decided range, for example, in a 1,000-m circle from the abnormality occurrence position may be affected, the current latitude, longitude, and distance are included in the notification target 205. The narrow area communication unit 111 notifies the range represented by the notification target 205 of the abnormality notification message including the notification target 205 via a vehicle or a road side machine.

If the determination unit 105 determines, regardless of the type of an abnormality, that there is a moving object control influence, it may be impossible to control the self-navigating vehicle, and the abnormality may affect the periphery. Hence, based on geographical information, vehicles, road side machines, and pedestrians (terminals held by pedestrians) existing in the range in which safety is affected are notified of the abnormality notification message. In this case, the determination unit 104 determines a predicted arrival position based on the abnormality contents and the abnormality occurrence position in the data 202 and the moving object operation information formed by a speed, an acceleration, a control state, and movement prediction information. The notification range is expressed by geographical information such as a latitude, a longitude, and a distance from the predicted arrival position and included in the notification target 205. The narrow area communication unit 111 notifies the range represented by the notification target 205 of an abnormality notification message including the notification target 205 via a vehicle or a road side machine.

Note that the above-described notification target determination is merely an example, and the notification target may be determined using information that can be acquired by the self-navigating vehicle or information that can be acquired from other vehicles or road side machines.

Processing performed by a notification apparatus 10 to notify the outside of an abnormality will be described next with reference to a flowchart shown in FIG. 8. The same step numbers as in FIG. 5 denote the same processing steps in FIG. 8, and a description of the processing steps will be omitted.

In step S801, a notification unit 101 determines whether the notification target 205 is included in an abnormality notification message. As the result of this determination, if it is determined that the notification target 205 is included in the abnormality notification message, the process advances to step S802. On the other hand, if the notification target 205 is not included in the abnormality notification message, the process advances to step S507.

Figure 9:
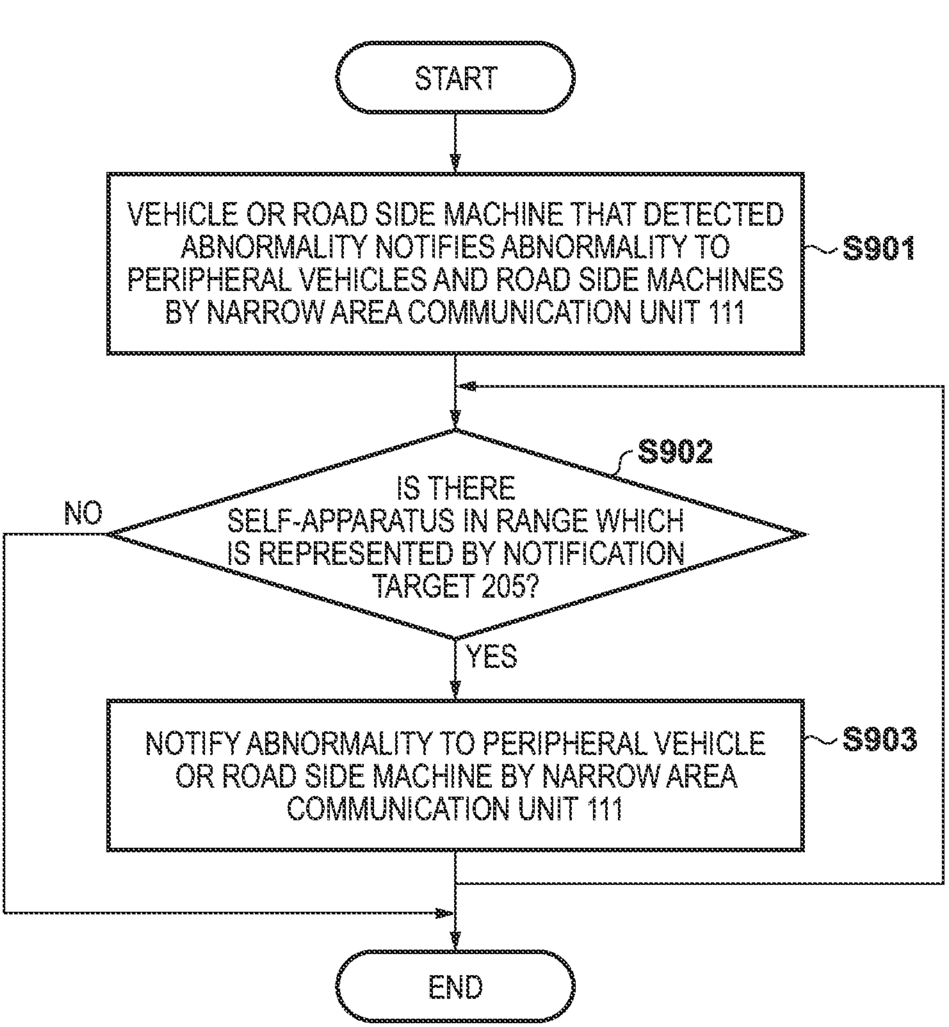
FIG. 9 is a flowchart showing details of processing of step S802.

In step S802, the narrow area communication unit 111 performs processing for notifying a vehicle or a road side machine existing in the range represented by the notification target 205 of the abnormality notification message. Details of the processing of step S802 will be described with reference to a flowchart shown in FIG. 9.

In step S901, the narrow area communication unit 111 notifies vehicles and road side machines on the periphery of the self-navigating apparatus of the abnormality notification message.

In step S902, upon receiving an abnormality notification message from another mounting apparatus, the notification unit 101 determines whether the self-navigating apparatus is included in the range represented by the notification target 205 included in the abnormality notification message. As the result of this determination, if it is determined that the self-navigating apparatus is included in the range represented by the notification target 205 included in the abnormality notification message received from another mounting apparatus, the process advances to step S903. On the other hand, if the self-navigating apparatus is not included in the range represented by the notification target 205 included in the abnormality notification message received from another mounting apparatus, the process advances to step S507.

In step S903, the narrow area communication unit 111 transfers the abnormality notification message received from another mounting apparatus to vehicles and road side machines on the periphery of the self-navigating apparatus. This transfer is repeated, thereby notifying all vehicles and road side machines in the range (narrow area) represented by the notification target 205 of the abnormality.

Note that in the flowchart of FIG. 8, the processes of steps S508 to S510 are executed after the process of step S802. However, the order is not limited to this. That is, the processes of steps S508 to S510 may be executed before the process of step S802, or the processes of steps S508 to S510 and the process of step S802 may be executed concurrently.

As described above, according to this embodiment, a partner desirable to notify an abnormality based on geographical information outside the range where the narrow area communication unit 111 can communicate can be notified of an abnormality.

Third Embodiment

In this embodiment, a case where a drone and a road side machine are applied as a moving object and a fixed communication apparatus, respectively, each of which is provided with a notification apparatus mounted therein will be described. That is, a mounting apparatus according to this embodiment is a drone or a road side machine. A notification apparatus 10 according to this embodiment has a configuration obtained by omitting a fourth abnormality detection unit 109 from the configuration shown in FIG. 1.

As in the first embodiment, a third abnormality detection unit 108 monitors external world information acquired by sensors mounted in the mounting apparatus 1, and detects, as a traffic abnormality, an abnormality that affects the operation of the drone or driving of a vehicle on the ground because of an event that has occurred in the external world. For example, upon recognizing, from a video captured by a camera, a load fallen on a road, a traffic accident that has occurred at an intersection, or an object such as a fallen tree or a balloon, which is an obstacle on the moving path of the drone, the third abnormality detection unit 108 detects the result of the recognition as a traffic abnormality. Also, upon detecting a drone or the like existing in a no entry area from a video captured by a camera, the third abnormality detection unit 108 detects the result of the detection as a traffic abnormality.

Based on the abnormality detected by an abnormality detection unit 103 and measurement results obtained by various kinds of sensors (a camera, a LiDAR, a speed sensor, an acceleration sensor, a rotation sensor, and the like) mounted in the drone, a determination unit 105 determines whether the drone can continue normal airframe control. For example, in a case where a fault that the leveling function of the drone is lost has occurred, upon determining, based on a peripheral situation acquired by a camera mounted in the drone, and the speed, the acceleration, the tilt, and the altitude of the drone, that the drone will crash because the fault of the leveling function cannot be covered by another function, the determination unit 105 determines that there is a moving object control influence.

Thus, upon determining that the drone cannot continue normal airframe control, the determination unit 105 determines that there is a moving object control influence. Upon determining that the drone can continue normal airframe control, the determination unit 105 determines that there is no moving object control influence.

A determination unit 104 determines (decides) the notification destination of an abnormality based on an abnormality detected by the abnormality detection unit 103 and the result of determination of the determination unit 105 (the presence/absence of a moving object control influence). Notification destinations of an abnormality are roughly classified into partners existing in a range (narrow area) based on geographical information representing a geographical position, such as a latitude, a longitude, an altitude, and a distance and partners each of which exists in a wide area not based on geographical information and can be specified by an IP address or the like.

If the determination unit 105 determines that there is a moving object control influence, this may affect the safety of drones on the periphery or vehicles on the ground. Hence, the determination unit 104 determines, for example, drones, vehicles, and the like existing within a predetermined range from a path predicted based on a video captured by a camera mounted in the drone, a speed measured by a speed sensor, and an abnormality occurrence position as the notification destination of the abnormality. Also, as in the first embodiment, even if the determination unit 105 does not determine that there is a moving object control influence, or even if a road side machine includes the notification apparatus 10 that is not provided with the determination unit 105, the notification destination of an abnormality can sometimes be determined in accordance with an abnormality detected by the abnormality detection unit 103.

As in the first embodiment, a generation unit 102 generates an abnormality notification message based on the abnormality detected by the abnormality detection unit 103, the result of determination of the determination unit 105 (the presence/absence of a moving object control influence), the notification destination of the abnormality determined by the determination unit 104, and the like.

Examples of the contents of attribute information 201 and data 202 for each type of an abnormality detected by the abnormality detection unit 103 (abnormality type) will be described with reference to FIGS. 10A-a to 10C-b. The generation unit 102 generates, for example, an abnormality notification message including the attribute information 201 and the data 202 according to rules shown in FIGS. 10A-a to 10C-b.

The contents shown in FIGS. 10A-a to 10C-b have the same configurations as those in FIGS. 3A-a to 3D-b except that information unique to a vehicle changes to information unique to a drone. An altitude (height) is added to the abnormality occurrence position and movement prediction information included in the data 202.

FIG. 10A-a shows an example of the attribute information 201 and the data 202 in a case where the abnormality detection unit 103 detects a security abnormality, and the determination unit 104 determines a partner in the narrow area as the notification destination of the abnormality notification message. FIG. 10A-b shows an example of the attribute information 201 and the data 202 in a case where the abnormality detection unit 103 detects a security abnormality, and the determination unit 104 determines a partner in the wide area as the notification destination of the abnormality notification message.

FIG. 10B-a shows an example of the attribute information 201 and the data 202 in a case where the abnormality detection unit 103 detects a safety abnormality, and the determination unit 104 determines a partner in the narrow area as the notification destination of the abnormality notification message. FIG. 10B-b shows an example of the attribute information 201 and the data 202 in a case where the abnormality detection unit 103 detects a safety abnormality, and the determination unit 104 determines a partner in the wide area as the notification destination of the abnormality notification message.

FIG. 10C-a shows an example of the attribute information 201 and the data 202 in a case where the abnormality detection unit 103 detects a traffic abnormality, and the determination unit 104 determines a partner in the narrow area as the notification destination of the abnormality notification message. FIG. 10C-b shows an example of the attribute information 201 and the data 202 in a case where the abnormality detection unit 103 detects a traffic abnormality, and the determination unit 104 determines a partner in the wide area as the notification destination of the abnormality notification message.

Note that the configurations of the data 202 and the attribute information 201 shown in FIGS. 10A-a to 10C-b are merely examples. For example, the data 202 and the attribute information 201 may include other pieces of information in place of or in addition to the information shown in FIGS. 10A-a to 10C-b.

If a security abnormality occurs, it may affect drones and road side machines existing in remote sites. For example, a drone or a road side machine of the same software version as that of the mounting apparatus in which the security abnormality has occurred may suffer the same attack as the mounting apparatus. For this reason, if a security abnormality has occurred in a mounting apparatus, the determination unit 104 determines a maker or the like as the notification destination and decides the IP address of the notification destination, and a wide area communication unit 110 transmits an abnormality notification message to the notification destination of the IP address.

In addition, if a security abnormality occurs, an apparatus that collects information about the security abnormality may also be decided as the notification destination of the abnormality notification message. For example, the determination unit 104 determines, as the notification destination, a management center that collects log data of a drone, measurement results obtained by sensors, information about an abnormality, and the like and performs analysis and handling, and decides the IP address of the management center. Then, the wide area communication unit 110 notifies the management center of the IP address via a base station of an abnormality notification message configured to notify the security abnormality. The notification destination of the abnormality notification message by the wide area communication unit 110 is determined in advance by the maker, the model of the drone, the security service company, and the like, and a notification is made when a security abnormality occurs.

If a safety abnormality occurs, an apparatus that collects information about the safety abnormality may also be decided as the notification destination of the abnormality notification message. For example, the determination unit 104 determines, as the notification destination, a maker that collects information about a function fault of drones and conducts a recall or a management center, like the security abnormality, and decides the IP address of the notification destination. Then, the wide area communication unit 110 notifies the notification destination of the IP address via a base station of an abnormality notification message configured to notify the safety abnormality. The notification destination of the abnormality notification message by the wide area communication unit 110 is determined in advance by the maker, the model of the drone, and the like, and a notification is made when a safety abnormality occurs.

If a traffic abnormality occurs, the wide area communication unit 110 notifies a partner that handles the traffic abnormality in accordance with the contents of the traffic abnormality. For example, if the contents of the traffic abnormality indicate drone invasion into a no entry area, it is preferable to notify the illegal act. Hence, the determination unit 104 determines a police station as the notification destination, and decides the IP address of the police station. Then, the wide area communication unit 110 notifies the police station of the IP address via a base station of an abnormality notification message configured to notify the drone invasion into the no entry area.

Furthermore, if the determination unit 105 determines, regardless of the type of an abnormality, that there is a moving object control influence, it may be impossible to control the drone or a road side machine, and the abnormality may affect the periphery. Hence, based on geographical information representing the affected range, the determination unit 104 determines drones, vehicles, road side machines, and pedestrians (terminals held by pedestrians) existing in the range as notification targets. In this case, the determination unit 104 determines a predicted arrival position based on the abnormality contents and the abnormality occurrence position in the data 202 and the moving object operation information including a speed, an acceleration, a control state, and movement prediction information. A narrow area communication unit 111 notifies the vehicles, the drones, the road side machines, and the pedestrians (the terminals held by the pedestrians) in the determined notification range of an abnormality notification message.

Figure 11:
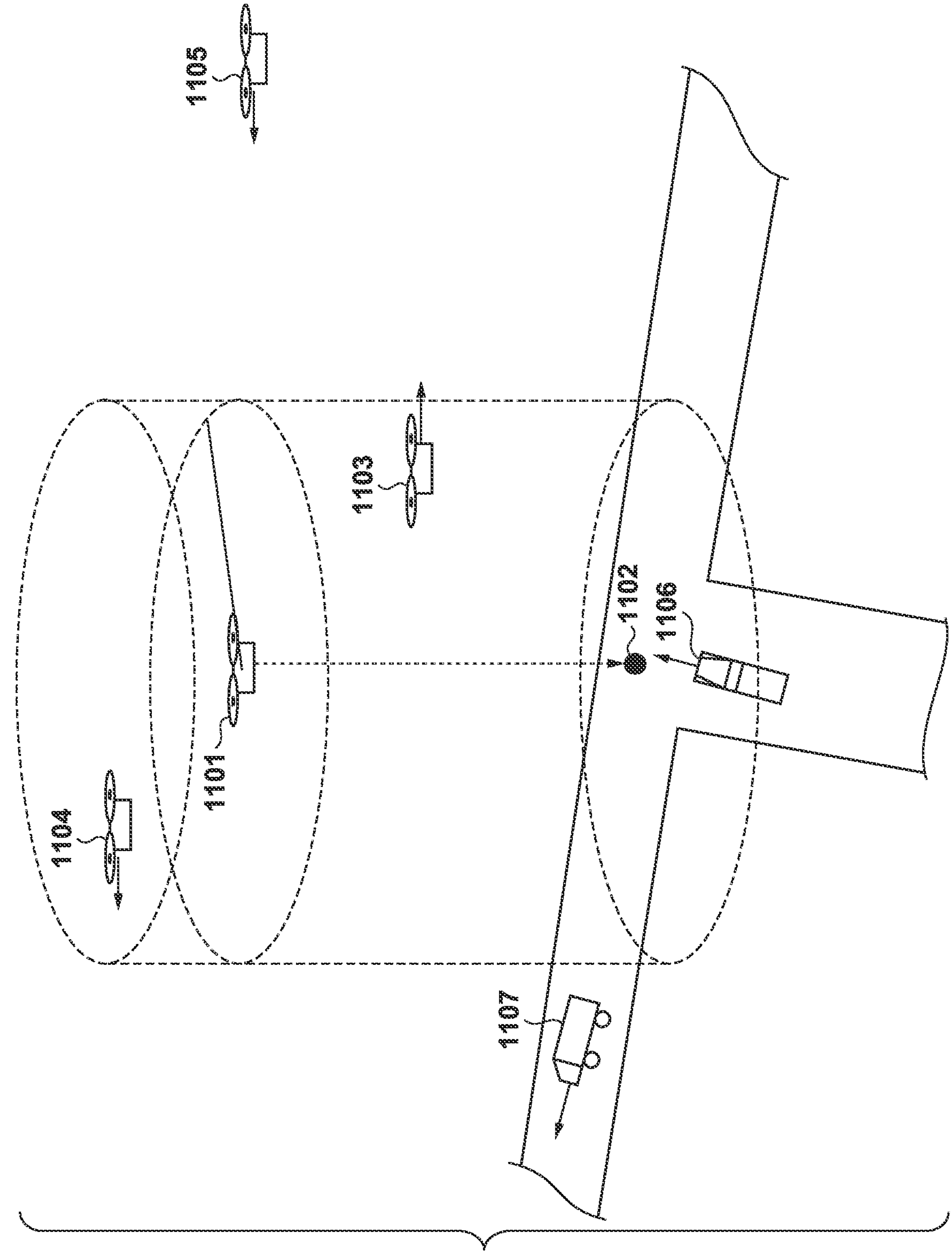
FIG. 11 is a view showing an example of the range of a notification in a case where loss of an airframe horizontal maintaining function of a drone has occurred as a safety abnormality.

FIG. 11 is a view showing an example of the range of a notification in a case where the airframe horizontal maintaining function of a drone is lost as a safety abnormality. A drone 1101 that has lost the airframe horizontal maintaining function cannot be controlled and is predicted to fall to a coordinate position 1102 on the ground having the same latitude and longitude as those of the drone. At this time, the determination unit 104 determines, as the notification destination, a partner existing in a predetermined distance from a range through which the drone passes from the abnormality occurrence position to a predicted arrival position represented by the movement prediction information. The coordinates on the ground can be acquired from three-dimensional map information held by the drone or the abnormality occurrence position and information acquired by the sensors. In this example, a vehicle or a drone existing in the range of a circular column indicated by dotted lines in FIG. 11 is determined as the notification destination. The circular column indicated by the dotted lines in FIG. 11 is a circular column having a bottom surface formed by a circular with respect to the coordinate position 1102 as the center and a height equal to or more than the height of the drone 1101. In this case, the output of DSRC is controlled, thereby notifying a range of 20 m from the self-navigating apparatus of the safety abnormality. Thus, drones 1103 and 1104 and a vehicle 1106, which exist in the notification range, are notified of the safety abnormality. Note that the above-described notification target determination is merely an example, and the notification target may be determined using information that can be acquired by the drone or information that can be acquired from other moving bodies or road side machines.

Processing performed by the notification apparatus 10 to notify the outside of an abnormality is processing in which processing associated with an abnormality concerning an operator is omitted from the processing according to the flowchart shown in FIG. 5. That is, in step S501, the abnormality detection unit 103 (each of a first abnormality detection unit 106, a second abnormality detection unit 107, and the third abnormality detection unit 108) performs detection processing of detecting the occurrence of an abnormality. If the type of the abnormality detected in step S501 is a traffic abnormality, the process advances to step S510 via step S507.

As described above, according to this embodiment, it is possible to discriminately detect the type of an abnormality that occurs in a drone that is a moving object and notify an appropriate partner of the abnormality in consideration of a situation unique to the drone. Note that the drone is an example of a flying body capable of flying in a three-dimensional space, and the apparatus applicable as a flying body is not limited to a drone.

Fourth Embodiment

Differences from the third embodiment will be described below. In this embodiment, a generation unit 102 generates, as an abnormality notification message configured to make a notification to a partner in a narrow area, an abnormality notification message having a configuration obtained by adding a notification target 205 described in the second embodiment to an abnormality notification message having a configuration according to the third embodiment. By the abnormality notification message including the notification target 205, it is possible to notify a partner existing in the narrow area of the abnormality notification message via another drone or road side machine by a method to be described later. The notification target 205 according to this embodiment is geographical information including an altitude and a horizontal distance from a center point in addition to a latitude and a longitude. When the altitude and the horizontal distance from the center point are added, a circular column having a height and a radius designated from the center point can be expressed, and a three-dimensional space can be designated as the notification range of the narrow area.

Examples of the contents of attribute information 201, the notification target 205, and data 202 for each abnormality type in a case where a partner in the narrow area is determined as the notification destination will be described with reference to FIGS. 12A-a1, 12A-a2, 12A-b, 12B-1, and 12B-2. The contents of the attribute information 201 and the data 202 for each abnormality type in a case where a partner in the wide area is determined as the notification destination are the same as in the third embodiment. The generation unit 102 generates, for example, an abnormality notification message including the attribute information 201, the data 202, and the notification target 205 according to rules shown in FIGS. 12A-a1, 12A-a2, 12A-b, 12B-1, and 12B-2.

The contents shown in FIGS. 12A-a1, 12A-a2, 12A-b, 12B-1, and 12B-2 are the same as in FIGS. 7A-a1, 7A-a2, 7A-b1, 7A-b2, 7B-a1, 7B-a2, 7B-b1, and 7B-b2, respectively. An altitude is added to the abnormality occurrence position and movement prediction information included in the data 202, and an altitude is added to the coordinate information of the notification target 205. Also, to show the space to make a notification, the notification target 205 expresses the target by methods different from FIGS. 7A-a1, 7A-a2, 7A-b1, 7A-b2, 7B-a1, 7B-a2, 7B-b1, and 7B-b2. There are a case where the notification target is expressed by four or more latitudes, four or more longitudes, and four or more altitudes, and a case where the notification target is expressed by two latitudes, two longitudes, two altitudes, and one horizontal distance. In the former, a space formed by coordinates indicated by the four or more latitudes, four or more longitudes, and four or more altitudes is the notification target. In the latter, a circular column having, as a radius, a predetermined horizontal distance from a line connecting two latitudes, two longitudes, and two altitudes is the notification target.

FIGS. 12A-a1 and 12A-a2 show an example of the attribute information 201, the notification target 205, and the data 202 in a case where an abnormality detection unit 103 detects a security abnormality, and a determination unit 104 determines a partner in the narrow area as the notification destination of the abnormality notification message.

FIG. 12A-b shows an example of the attribute information 201, the notification target 205, and the data 202 in a case where the abnormality detection unit 103 detects a safety abnormality, and the determination unit 104 determines a partner in the narrow area as the notification destination of the abnormality notification message.

FIGS. 12B-1 and 12B-2 show an example of the attribute information 201, the notification target 205, and the data 202 in a case where the abnormality detection unit 103 detects a traffic abnormality, and the determination unit 104 determines a partner in the narrow area as the notification destination of the abnormality notification message.

Note that the configurations of the attribute information 201, the notification target 205, and the data 202 shown in FIGS. 12A-a1, 12A-a2, 12A-b, 12B-1, and 12B-2 are merely examples. For example, the attribute information 201, the notification target 205, and the data 202 may include other information in place of or in addition to the information shown in FIGS. 12A-a1, 12A-a2, 12A-b, 12B-1, and 12B-2.

Note that a narrow area communication unit 111 may directly notify a partner existing in a range corresponding to geographical information of the abnormality notification message. For a range where the narrow area communication unit 111 cannot directly perform communication, a vehicle or a road side machine on the periphery may be notified of the abnormality notification message. In this case, the vehicle or the road side machine that has received the abnormality notification message may refer to the notification target 205, and notify the partner by repeating transfer of the abnormality notification message such that the abnormality notification message is notified to a partner in a range corresponding to the notification target 205.

More specifically, the drone or the road side machine that has detected an abnormality first notifies a drone or a road side machine on the periphery of the abnormality notification message including the notification target 205, as in the third embodiment. The drone or the road side machine that has received the abnormality notification message confirms the notification target 205 included in the abnormality notification message and confirms whether the self-navigating apparatus exists in the range represented by the notification target 205. If the self-navigating apparatus exists outside the range represented by the notification target 205, it neglects the received abnormality notification message. On the other hand, if the selfnavigating apparatus exists within the range represented by the notification target 205, the self-navigating apparatus confirms the received abnormality notification message, and the narrow area communication unit 111 of the self-navigating apparatus transfers the received abnormality notification message to a road side machine or a drone on the periphery. This operation is repeated, thereby notifying a partner in the range represented by the notification target 205 of the abnormality notification message via the drone or the road side machine.

If the abnormality type included in the attribute information 201 included in the abnormality notification message is a security abnormality, a wide area communication unit 110 notifies a partner specified by a predetermined IP address of the abnormality notification message via a base station, as in the first embodiment. In a case of a security abnormality, for example, if the abnormality contents indicate reception of an unauthentic message from another drone, there is a possibility that the determination unit 104 can predict the moving path of an attacking drone based on the abnormality occurrence position, and the speed and the advancing direction of the drone (attacking drone) that is attacking. In this case, since a drone or a road side machine existing in the predicted path may be attacked, the abnormality occurrence position (the latitude and the longitude), the altitude, and the horizontal distance from the center point (abnormality occurrence position) are included in the notification target 205. The narrow area communication unit 111 notifies the range represented by the notification target 205 of the abnormality notification message including the notification target 205 via another drone or a road side machine.

If the abnormality type included in the attribute information 201 included in the abnormality notification message is a traffic abnormality, the wide area communication unit 110 notifies a partner specified by a predetermined IP address of the abnormality notification message via a base station, as in the first embodiment. Here, in a case of a traffic abnormality, for example, if the abnormality contents indicate an object in the air, there is a possibility that the determination unit 104 can decide, based on the abnormality occurrence position or the like, a range where a drone whose moving path may be changed exists. In this case, since a drone existing in the decided range, for example, in a circular column having a radius of 10 m and a height of 10 m from the self-navigating apparatus may be affected, the current latitude, longitude, altitude, and horizontal distance from the center point are included in the notification target 205. The narrow area communication unit 111 notifies the range represented by the notification target 205 of the abnormality notification message including the notification target 205 via a peripheral drone or a road side machine.

If the determination unit 105 determines, regardless of the type of an abnormality, that there is a moving object control influence, it may be impossible to control the drone, and the abnormality may affect the periphery. Hence, based on geographical information, drones, vehicles, road side machines, and pedestrians (terminals held by pedestrians) existing in the range in which safety is affected are notified of the abnormality notification message. In this case, the determination unit 104 determines a predicted arrival position based on the abnormality contents and the abnormality occurrence position in the data 202 and the moving object operation information formed by a speed, an acceleration, a control state, and movement prediction information. The notification range is expressed by geographical information such as a latitude, a longitude, and a horizontal distance from the center point and included in the notification target 205. The narrow area communication unit 111 notifies the range represented by the notification target 205 of an abnormality notification message including the notification target 205 via a peripheral drone or a road side machine. Note that the above-described notification target determination is merely an example, and the notification target may be determined using information that can be acquired by the drone or information that can be acquired from other drones or road side machines.

Processing performed by a notification apparatus 10 to notify the outside of an abnormality is processing in which processing associated with an abnormality concerning an operator is omitted from the processing according to the flowchart shown in FIG. 8. That is, in step S501, the abnormality detection unit 103 (each of a first abnormality detection unit 106, a second abnormality detection unit 107, and a third abnormality detection unit 108) performs detection processing of detecting the occurrence of an abnormality. If the type of the abnormality detected in step S501 is a traffic abnormality, the process advances to step S510 via step S507.

As described above, according to this embodiment, even if the notification apparatus 10 is mounted in the drone in the second embodiment, it is possible to discriminately detect the type of an abnormality that occurs in a drone and notify an appropriate range of the abnormality in consideration of a situation unique to the drone.

Fifth Embodiment

Each function unit of a notification apparatus 10 shown in FIG. 1 may be implemented by hardware or software (computer program). In the latter case, a computer apparatus capable of executing the computer program can be applied to the notification apparatus 10. An example of the hardware configuration of the computer apparatus applicable to the notification apparatus 10 will be described with reference to a block diagram shown in FIG. 13.

A CPU 1301 executes various kinds of processing using computer programs and data stored in a RAM 1302 and a ROM 1303. Thus, the CPU 1301 controls the operation of the entire computer apparatus and executes or controls various kinds of processing described as processing to be performed by the notification apparatus 10.

The RAM 1302 includes an area configured to store computer programs and data loaded from the ROM 1303 or a nonvolatile memory 1304 and an area configured to store various kinds of data received from the outside via an I/F 1305. Also, the RAM 1302 includes a work area used by the CPU 1301 to execute various kinds of processing. Thus, the RAM 1302 can provide various kinds of areas as needed.

The ROM 1303 stores the setting data of the computer apparatus, computer programs and data associated with activation of the computer apparatus, computer programs and data associated with the basic operation of the computer apparatus, and the like.

The nonvolatile memory 1304 is an example of a mass information storage device. The nonvolatile memory 1304 stores an Operating System (OS), and computer programs and data configured to cause the CPU 1301 to execute or control various kinds of processing described as processing to be performed by the notification apparatus 10. The computer programs and data stored in the nonvolatile memory 1304 are loaded into the RAM 1302 as needed under the control of the CPU 1301 and processed by the CPU 1301.

The I/F 1305 is a communication interface configured to perform data communication with the outside. Pieces of information (a video, measurement results, and the like) acquired by various kinds of sensors described above are input from the sensors to the notification apparatus 10 via the I/F 1305. Also, an abnormality notification message generated by the notification apparatus 10 is transmitted to the outside via the I/F 1305. Also, an abnormality notification message transmitted from an external notification apparatus 10 is input to the notification apparatus 10 via the I/F 1305.

Figure 13:
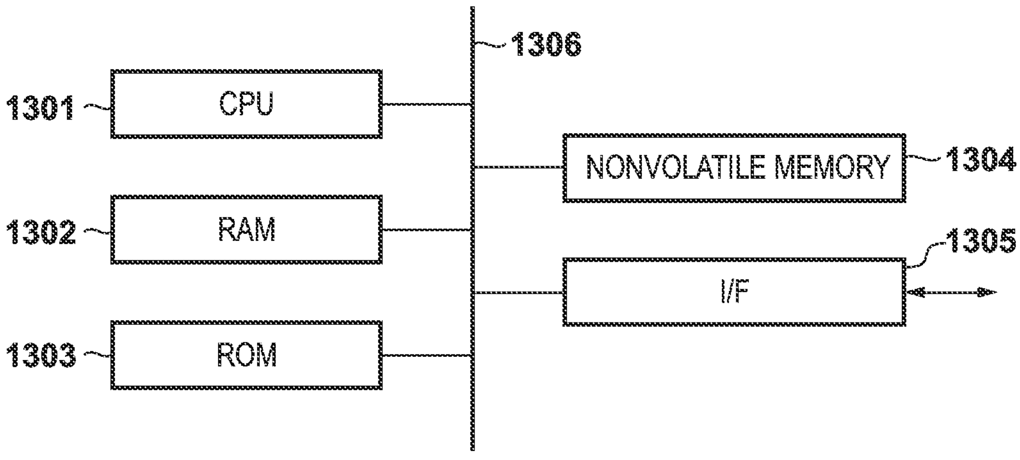
FIG. 13 is a block diagram showing an example of the hardware configuration of a computer apparatus applicable to the notification apparatus 10.

The CPU 1301, the RAM 1302, the ROM 1303, the nonvolatile memory 1304, and the I/F 1305 are all connected to a system bus 1306. Note that the configuration shown in FIG. 13 is an example of the hardware configuration of the computer apparatus applicable to the notification apparatus 10 and is not limited to the hardware configuration shown in FIG. 13. A hardware configuration applicable to the notification apparatus 10 mounted in a moving object and a hardware configuration applicable to the notification apparatus 10 mounted in a fixed communication apparatus may be identical or different.

Numerical values, processing timings, processing orders, subject of processing, configurations (including the number of dimensions)/acquisition methods/transmission destinations/transmission sources/storage locations of data (information) used in the above-described embodiments and modifications are merely examples for a detailed explanation. That is, the present invention is not intended to limit these to the examples.

Some or all of the above-described embodiments and modifications may be used in combinations as needed, or some or all of the above-described embodiments and modifications may selectively be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-114324, filed Jul. 15, 2022, which is hereby incorporated by reference herein in its entirety.

What is claimed is:

1. A notification apparatus comprising:

an acquisition unit configured to acquire an abnormality in a moving object which is detected by the moving object or a road side machine;

a determination unit configured to determine whether the first moving object can continue normal control based on the abnormality;

a decision unit configured to decide, based on the abnormality and a result of the determination by the determination unit, a notification destination of the abnormality among (a) first external devices within a range based on geographical information representing a geographical position and (b) second external devices which can be specified by a network address on a network to which the moving object is connected; and a notification unit configured to notify the decided notification destination of the abnormality, wherein the notification unit notifies the first external devices of an abnormality notification message including first contents which corresponds to both of a type of the abnormality and the first external devices if the determination unit does not determine that the moving object can continue normal control, wherein the notification unit notifies the second external devices of an abnormality notification message including second contents which corresponds to both of a security abnormality associated with security and the second external devices if the abnormality is the security abnormality, notifies the second external devices of an abnormality notification message including third contents which corresponds to both of a safety abnormality of an operation of a function of the moving object and the second external devices if the abnormality is the safety abnormality, notifies the second external devices of an abnormality notification message including fourth contents which corresponds to both of a traffic abnormality and the second external devices if the abnormality is the traffic abnormality, and notifies the second external devices of an abnormality notification message including the fourth contents which corresponds to both of an operator abnormality and the second external devices if the abnormality is the operator abnormality, and wherein the traffic abnormality affects control of the moving object because of an event that has occurred in an external world, and the operator abnormality represents a state in which an operator of the moving object cannot continue an operation of the moving object.

2. The notification apparatus according to claim 1, wherein the notification apparatus is mounted in the moving object, and the acquisition unit acquires the abnormality which is detected by the moving object.

3. The notification apparatus according to claim 1, wherein the notification apparatus is mounted in the road side machine, and the acquisition unit acquires the abnormality which is detected by the road side machine.

4. A notification method performed by a notification apparatus, the notification method comprising:

acquiring an abnormality in a moving object which is detected by the moving object or a road side machine;

determining whether the moving object can continue normal control based on the abnormality;

deciding, based on the abnormality and a result of the determination in the determining, a notification destination of the abnormality among (a) first external devices within a range based on geographical information representing a geographical position and (b) second external devices which can be specified by a network address on a network to which the moving object is connected; and notifying the decided notification destination of the abnormality, wherein the notifying notifies the first external devices of an abnormality notification message including first contents which corresponds to both of a type of the abnormality and the first external devices if the determining does not determine that the moving object can continue normal control, wherein the notifying notifies the second external devices of an abnormality notification message including second contents which corresponds to both of a security abnormality associated with security and the second external devices if the abnormality is the security abnormality, notifies the second external devices of an abnormality notification message including third contents which corresponds to both of a safety abnormality of an operation of a function of the moving object and the second external devices if the abnormality is the safety abnormality, notifies the second external devices of an abnormality notification message including fourth contents which corresponds to both of a traffic abnormality and the second external devices if the abnormality is the traffic abnormality, and notifies the second external devices of an abnormality notification message including the fourth contents which corresponds to both of an operator abnormality and the second external devices if the abnormality is the operator abnormality, and wherein the traffic abnormality affects control of the moving object because of an event that has occurred in an external world, and the operator abnormality represents a state in which an operator of the moving object cannot continue an operation of the moving object.

5. A non-transitory computer-readable storage medium storing a computer program including instructions, which when executed by a computer of a notification apparatus, cause the notification apparatus to perform:

acquiring an abnormality in a moving object which is detected by the moving object or a road side machine;

determining whether the moving object can continue normal control based on the abnormality;

deciding, based on the abnormality and a result of the determination in the determining, a notification destination of the abnormality among (a) first external devices within a range based on geographical information representing a geographical position and (b) second external devices which can be specified by a network address on a network to which the moving object is connected; and notifying the decided notification destination of the abnormality, wherein the notifying notifies the first external devices of an abnormality notification message including first contents which corresponds to both of a type of the abnormality and the first external devices if the determining does not determine that the moving object can continue normal control, wherein the notifying notifies the second external devices of an abnormality notification message including second contents which corresponds to both of a security abnormality associated with security and the second external devices if the abnormality is the security abnormality, notifies the second external devices of an abnormality notification message including third contents which corresponds to both of a safety abnormality of an operation of a function of the moving object and the second external devices if the abnormality is the safety abnormality, notifies the second external devices of an abnormality notification message including fourth contents which corresponds to both of a traffic abnormality and the second external devices if the abnormality is the traffic abnormality, and notifies the second external devices of an abnormality notification message including the fourth contents which corresponds to both of an operator abnormality and the second external devices if the abnormality is the operator abnormality, and wherein the traffic abnormality affects control of the moving object because of an event that has occurred in an external world, and the operator abnormality represents a state in which an operator of the moving object cannot continue an operation of the moving object.

* * * * *